(12) United States Patent
Bao et al.

(10) Patent No.: US 11,985,644 B2
(45) Date of Patent: May 14, 2024

(54) MEASUREMENT BEHAVIOR IN A PROCESSING WINDOW

(71) Applicant: QUALCOMM Incorporated, San Diego, CA (US)

(72) Inventors: Jingchao Bao, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 247 days.

(21) Appl. No.: 17/491,396

(22) Filed: Sep. 30, 2021

(65) Prior Publication Data

US 2023/0110581 A1 Apr. 13, 2023

(51) Int. Cl.
*H04W 72/0453* (2023.01)
*H04B 17/309* (2015.01)

(52) U.S. Cl.
CPC ...... *H04W 72/0453* (2013.01); *H04B 17/309* (2015.01)

(58) Field of Classification Search
CPC . H04W 72/0453; H04B 17/309; H04L 5/0048
See application file for complete search history.

(56) References Cited

U.S. PATENT DOCUMENTS

| | | | | |
|---|---|---|---|---|
| 2020/0221306 A1* | 7/2020 | Chen | ...... | H04W 16/14 |
| 2021/0067990 A1* | 3/2021 | Opshaug | ...... | H04W 4/029 |
| 2021/0242913 A1* | 8/2021 | Manolakos | ...... | H04L 5/0064 |
| 2021/0351887 A1* | 11/2021 | Qi | ...... | H04L 5/005 |
| 2022/0026517 A1* | 1/2022 | Hasegawa | ...... | G01S 1/08 |
| 2022/0131727 A1* | 4/2022 | Khoryaev | ...... | H04L 27/261 |
| 2022/0330041 A1* | 10/2022 | Lee | ...... | G01S 5/0205 |
| 2023/0025902 A1* | 1/2023 | Xu | ...... | H04W 72/0446 |
| 2023/0063450 A1* | 3/2023 | Fakoorian | ...... | H04L 5/0051 |

FOREIGN PATENT DOCUMENTS

| | | | | |
|---|---|---|---|---|
| CN | 112187423 A | * | 1/2021 | ...... G01S 5/0205 |
| WO | WO-2019096237 A1 | * | 5/2019 | ...... H04B 17/24 |
| WO | WO-2020205656 A1 | | 10/2020 | |

OTHER PUBLICATIONS

International Search Report and Written Opinion—PCT/US2022/075302—ISA/EPO—dated Dec. 5, 2022.

* cited by examiner

*Primary Examiner* — Yu-Wen Chang
(74) *Attorney, Agent, or Firm* — Weaver Austin Villeneuve & Sampson LLP/QUALCOMM

(57) ABSTRACT

Techniques are provided in which changes to a bandwidth part (BWP) of a target user equipment (UE) are restricted during a processing window (PW) for measuring and processing reference signal (RS) resources. These BWP change restrictions may be implemented by employing any combination of (i) ensuring a serving base station will not reconfigure or switch the BWP during the PW, (ii) ensuring the UE suspends a BWP inactivity timer of current BWP, (iii) ensuring the numerology and/or bandwidth (BW) of the BWP do not change, and/or (iv) preventing a change to an overlapping spectrum between the BWP and a spectrum of the RS resources.

31 Claims, 17 Drawing Sheets

MEASUREMENT BEHAVIOR IN A PROCESSING WINDOW

BACKGROUND

1. Field of Disclosure

The present disclosure relates generally to the field of wireless communications, and more specifically to relates to the processing of radio frequency (RF) signals for the positioning of a mobile device.

2. Description of Related Art

In a Fifth Generation (5G) New Radio (NR) mobile communication network, a network node (e.g., base station or reference user equipment (UE)) may transmit a reference signal (RS) that can be measured at a target UE to determine the location of the target UE using any of a variety of network-based positioning methods. An increase in a number of signals measured by the target UE can result in an increase in accuracy. The target UE can be configured to measure some signals during a measurement gap (MG), but there are limitations to how an MG may be used.

BRIEF SUMMARY

Techniques are provided in which changes to a bandwidth part (BWP) of a target user equipment (UE) are restricted during a processing window (PW) for measuring and processing reference signal (RS) resources. These BWP change restrictions may be implemented by employing any combination of (i) ensuring a serving base station will not reconfigure or switch the BWP during the PW, (ii) ensuring the UE suspends a BWP inactivity timer of current BWP, (iii) ensuring the numerology and/or bandwidth (BW) of the BWP do not change, and/or (iv) preventing a change to an overlapping spectrum between the BWP and a spectrum of the RS resources.

An example method of coordinating reference signal (RS) processing by a user equipment (UE), according to this disclosure, may comprise obtaining information regarding at least one processing window (PW) during which the UE is configured to perform one or more measurements of one or more RS resources, the one or more RS resources having a first frequency spectrum. The method also may comprise implementing a bandwidth part (BWP) restriction of a first BWP of the UE during the at least one PW based at least in part on the information regarding the at least one PW, wherein: the first BWP has a second frequency spectrum, the first frequency spectrum and the second frequency spectrum at least partly overlap to form an overlapping spectrum, and the first BWP and the one or more RS resources have the same numerology.

An example method of coordinating reference signal (RS) processing by a user equipment (UE), according to this disclosure, may comprise obtaining, at the UE, information regarding at least one processing window (PW) during which the UE is configured to perform one or more measurements of one or more RS resources, the one or more RS resources having a first frequency spectrum. The method also may comprise performing the one or more measurements of the one or more RS resources with the UE during the at least one PW using an active BWP of the UE, wherein, for at least a portion of the at least one PW, the active BWP uses a second frequency spectrum that at least partly overlaps with the first frequency spectrum. The method also may comprise sending information indicative of the one or more measurements of the one or more RS resources from the UE to a location server.

An example device for coordinating reference signal (RS) processing by a user equipment (UE), according to this disclosure, may comprise a transceiver, a memory, one or more processors communicatively coupled with the transceiver and the memory, wherein the one or more processors are configured to obtain information regarding at least one processing window (PW) during which the UE is configured to perform one or more measurements of one or more RS resources, the one or more RS resources having a first frequency spectrum. The one or more processors further may be configured to implement a bandwidth part (BWP) restriction of a first BWP of the UE during the at least one PW based at least in part on the information regarding the at least one PW, wherein: the first BWP has a second frequency spectrum, the first frequency spectrum and the second frequency spectrum at least partly overlap to form an overlapping spectrum, and the first BWP and the one or more RS resources have the same numerology.

An example user equipment (UE) for coordinating reference signal (RS) processing, according to this disclosure, may comprise a transceiver, a memory, one or more processors communicatively coupled with the transceiver and the memory, wherein the one or more processors are configured to obtain, via the transceiver, information regarding at least one processing window (PW) during which the UE is configured to perform one or more measurements of one or more RS resources, the one or more RS resources having a first frequency spectrum. The one or more processors further may be configured to perform the one or more measurements of the one or more RS resources with the UE during the at least one PW using an active BWP of the UE, wherein, for at least a portion of the at least one PW, the active BWP uses a second frequency spectrum that at least partly overlaps with the first frequency spectrum. The one or more processors further may be configured to send information indicative of the one or more measurements of the one or more RS resources via the transceiver to a location server.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

Figure 1:
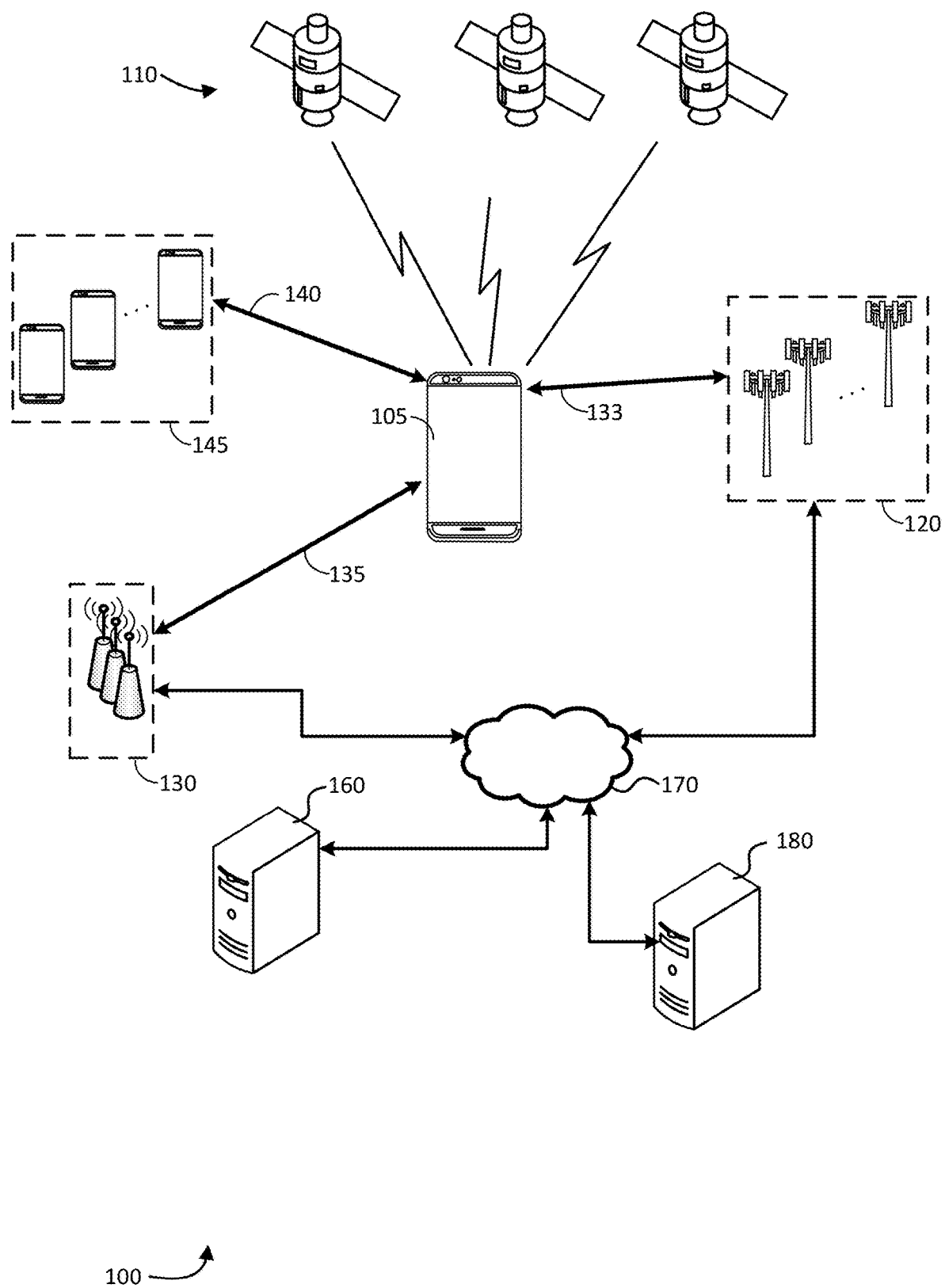
FIG. 1 is a diagram of a positioning system, according to an embodiment.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110*a*, 110*b*, 110*c*, etc. When referring to such an element using only the first number, any instance of the element is to be understood (e.g., element 110 in the previous example would refer to elements 110-1, 110-2, and 110-3 or to elements 110*a*, 110*b*, and 110*c*).

DETAILED DESCRIPTION

The following description is directed to certain implementations for the purposes of describing innovative aspects of various embodiments. However, a person having ordinary skill in the art will readily recognize that the teachings herein can be applied in a multitude of different ways. The described implementations may be implemented in any device, system, or network that is capable of transmitting and receiving radio frequency (RF) signals according to any communication standard, such as any of the Institute of Electrical and Electronics Engineers (IEEE) IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology.

As used herein, an "RF signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multiple channels or paths.

Additionally, unless otherwise specified, references to "reference signals," "positioning reference signals," "reference signals for positioning," and the like may be used to refer to signals used for positioning of a user equipment (UE). Such a signal is generically referred to herein as a reference signal (RS). As described in more detail herein, such signals may comprise any of a variety of signal types but may not necessarily be limited to a Positioning Reference Signal (PRS) as defined in relevant wireless standards.

As described in further detail hereafter, embodiments herein allow for the use by a UE of a processing window (PW) for processing reference signals for positioning the UE. According to some embodiments, this can be done without the use of a measurement gap (MG), allowing the UE to measure reference signals inside an active downlink (DL) bandwidth part (BWP). Accordingly, embodiments may restrict changing the active DL BWP (or, more broadly, an active BWP), during a PW. Such measurements may be used alone or in conjunction with other measurements (e.g., which may have utilized an MG) for positioning of the UE. Additional details will follow after an initial description of relevant systems and technologies.

FIG. 1 is a simplified illustration of a positioning system 100 in which a UE 105, location server 160, and/or other components of the positioning system 100 can use the techniques provided herein for PW usage for positioning of the UE 105, according to an embodiment. The techniques described herein may be implemented by one or more components of the positioning system 100. The positioning system 100 can include: a UE 105; one or more satellites 110 (also referred to as space vehicles (SVs)) for a Global Navigation Satellite System (GNSS) such as the Global Positioning System (GPS), GLONASS, Galileo or Beidou; base stations 120; access points (APs) 130; location server 160; network 170; and external client 180. Generally put, the positioning system 100 can estimate a location of the UE 105 based on RF signals received by and/or sent from the UE 105 and known locations of other components (e.g., GNSS satellites 110, base stations 120, APs 130) transmitting and/or receiving the RF signals. Additional details regarding particular location estimation techniques are discussed in more detail with regard to FIG. 2.

It should be noted that FIG. 1 provides only a generalized illustration of various components, any or all of which may be utilized as appropriate, and each of which may be duplicated as necessary. Specifically, although only one UE 105 is illustrated, it will be understood that many UEs (e.g., hundreds, thousands, millions, etc.) may utilize the positioning system 100. Similarly, the positioning system 100 may include a larger or smaller number of base stations 120 and/or APs 130 than illustrated in FIG. 1. The illustrated connections that connect the various components in the positioning system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to location server 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a wireless local area network (WLAN), a wireless wide-area network (WWAN), and/or the Internet, for example. Examples of network 170 include a Long-Term Evolution (LTE) wireless network, a Fifth Generation (5G) wireless network (also referred to as New Radio (NR) wireless network or 5G NR wireless network), a Wi-Fi WLAN, and the Internet. LTE, 5G and NR are wireless technologies defined, or being defined, by the 3rd Generation Partnership Project (3GPP). Network 170 may also include more than one network and/or more than one type of network.

The base stations 120 and access points (APs) 130 may be communicatively coupled to the network 170. In some embodiments, the base station 120s may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that Network 170 is a 5G network. An AP 130 may comprise a Wi-Fi AP or a Bluetooth® AP or an AP having cellular capabilities (e.g., 4G LTE and/or 5G NR), for example. Thus, UE 105 can send and receive information with network-connected devices, such as location server 160, by accessing the network 170 via a base station 120 using a first communication link 133. Additionally or alternatively, because APs 130 also may be communicatively coupled with the network 170, UE 105 may communicate with network-connected and Internet-connected devices, including location server 160, using a second communication link 135, or via one or more other UEs 145.

As used herein, the term "base station" may generically refer to a single physical transmission point, or multiple co-located physical transmission points, which may be located at a base station 120. A Transmission Reception Point (TRP) (also known as transmit/receive point) corresponds to this type of transmission point, and the term "TRP" may be used interchangeably herein with the terms "gNB," "ng-eNB," and "base station." In some cases, a base station 120 may comprise multiple TRPs—e.g. with each TRP associated with a different antenna or a different antenna array for the base station 120. Physical transmission points may comprise an array of antennas of a base station 120 (e.g., as in a Multiple Input-Multiple Output (MIMO) system and/or where the base station employs beamforming). The term "base station" may additionally refer to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station).

As used herein, the term "cell" may generically refer to a logical communication entity used for communication with a base station 120, and may be associated with an identifier for distinguishing neighboring cells (e.g., a Physical Cell Identifier (PCID), a Virtual Cell Identifier (VCID)) operating via the same or a different carrier. In some examples, a carrier may support multiple cells, and different cells may be configured according to different protocol types (e.g., Machine-Type Communication (MTC), Narrowband Internet-of-Things (NB-IoT), Enhanced Mobile Broadband (eMBB), or others) that may provide access for different types of devices. In some cases, the term "cell" may refer to a portion of a geographic coverage area (e.g., a sector) over which the logical entity operates.

The location server 160 may comprise a server and/or other computing device configured to determine an estimated location of UE 105 and/or provide data (e.g., "assistance data") to UE 105 to facilitate location measurement and/or location determination by UE 105. According to some embodiments, location server 160 may comprise a Home Secure User Plane Location (SUPL) Location Platform (H-SLP), which may support the SUPL user plane (UP) location solution defined by the Open Mobile Alliance (OMA) and may support location services for UE 105 based on subscription information for UE 105 stored in location server 160. In some embodiments, the location server 160 may comprise, a Discovered SLP (D-SLP) or an Emergency SLP (E-SLP). The location server 160 may also comprise an Enhanced Serving Mobile Location Center (E-SMLC) that supports location of UE 105 using a control plane (CP) location solution for LTE radio access by UE 105. The location server 160 may further comprise a Location Management Function (LMF) that supports location of UE 105 using a control plane (CP) location solution for NR or LTE radio access by UE 105.

In a CP location solution, signaling to control and manage the location of UE 105 may be exchanged between elements of network 170 and with UE 105 using existing network interfaces and protocols and as signaling from the perspective of network 170. In a UP location solution, signaling to control and manage the location of UE 105 may be exchanged between location server 160 and UE 105 as data (e.g. data transported using the Internet Protocol (IP) and/or Transmission Control Protocol (TCP)) from the perspective of network 170.

As previously noted (and discussed in more detail below), the estimated location of UE 105 may be based on measurements of RF signals sent from and/or received by the UE 105. In particular, these measurements can provide information regarding the relative distance and/or angle of the UE 105 from one or more components in the positioning system 100 (e.g., GNSS satellites 110, APs 130, base stations 120). The estimated location of the UE 105 can be estimated geometrically (e.g., using multiangulation and/or multilateration), based on the distance and/or angle measurements, along with known position of the one or more components.

Although terrestrial components such as APs 130 and base stations 120 may be fixed, embodiments are not so limited. Mobile components may be used. For example, in some embodiments, a location of the UE 105 may be estimated at least in part based on measurements of RF signals 140 communicated between the UE 105 and one or more other UEs 145, which may be mobile or fixed. When or more other UEs 145 are used in the position determination of a particular UE 105, the UE 105 for which the position is to be determined may be referred to as the "target UE," and each of the one or more other UEs 145 used may be referred to as an "anchor UE." For position determination of a target UE, the respective positions of the one or more anchor UEs may be known and/or jointly determined with the target UE. Direct communication between the one or more other UEs 145 and UE 105 may comprise sidelink and/or similar Device-to-Device (D2D) communication technologies. Sidelink, which is defined by 3GPP, is a form of D2D communication under the cellular-based LTE and NR standards.

An estimated location of UE 105 can be used in a variety of applications—e.g. to assist direction finding or navigation for a user of UE 105 or to assist another user (e.g. associated with external client 180) to locate UE 105. A "location" is also referred to herein as a "location estimate", "estimated location", "location", "position", "position estimate", "position fix", "estimated position", "location fix" or "fix". The process of determining a location may be referred to as "positioning," "position determination," "location determination," or the like. A location of UE 105 may comprise an absolute location of UE 105 (e.g. a latitude and longitude and possibly altitude) or a relative location of UE 105 (e.g. a location expressed as distances north or south, east or west and possibly above or below some other known fixed location (including, e.g., the location of a base station 120 or AP 130) or some other location such as a location for UE 105 at some known previous time, or a location of another UE 145 at some known previous time). A location may be specified as a geodetic location comprising coordinates which may be absolute (e.g. latitude, longitude and optionally altitude), relative (e.g. relative to some known absolute location) or local (e.g. X, Y and optionally Z coordinates according to a coordinate system defined relative to a local area such a factory, warehouse, college campus, shopping mall, sports stadium or convention center). A location may instead be a civic location and may then comprise one or more of a street address (e.g. including names or labels for a country, state, county, city, road and/or street, and/or a road or street number), and/or a label or name for a place, building, portion of a building, floor of a building, and/or room inside a building etc. A location may further include an uncertainty or error indication, such as a horizontal and possibly vertical distance by which the location is expected to be in error or an indication of an area or volume (e.g. a circle or ellipse) within which UE 105 is expected to be located with some level of confidence (e.g. 95% confidence).

The external client 180 may be a web server or remote application that may have some association with UE 105 (e.g. may be accessed by a user of UE 105) or may be a server, application, or computer system providing a location service to some other user or users which may include obtaining and providing the location of UE 105 (e.g. to enable a service such as friend or relative finder, or child or pet location). Additionally or alternatively, the external client 180 may obtain and provide the location of UE 105 to an emergency services provider, government agency, etc.

Figure 2:
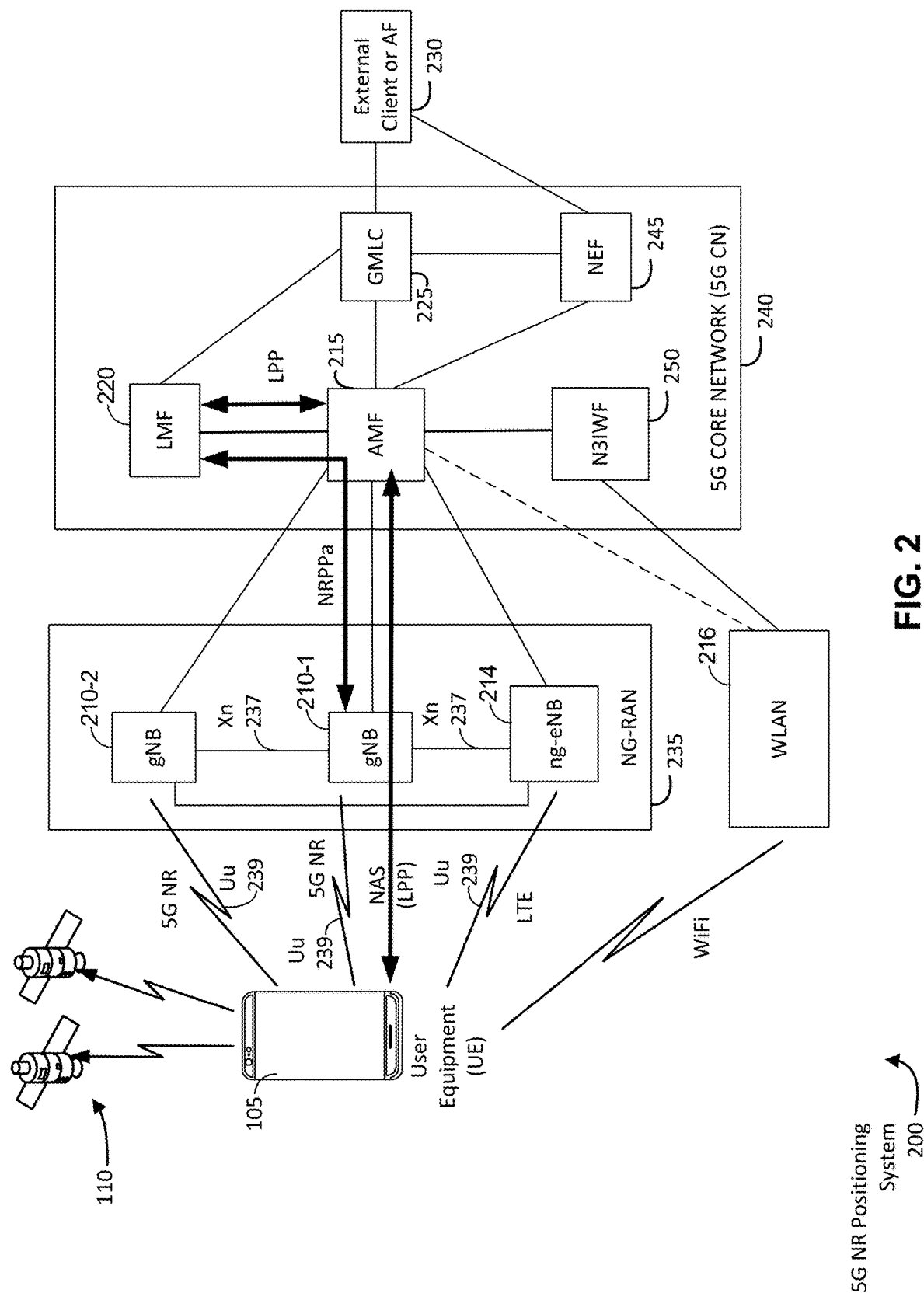
FIG. 2 is a diagram of a 5th Generation (5G) New Radio (NR) positioning system, illustrating an embodiment of a positioning system (e.g., the positioning system of FIG. 1) implemented within a 5G NR communication system.

As previously noted, the example positioning system 100 can be implemented using a wireless communication network, such as an LTE-based or 5G NR-based network. FIG. 2 shows a diagram of a 5G NR positioning system 200, illustrating an embodiment of a positioning system (e.g., positioning system 100) implementing 5G NR. The 5G NR positioning system 200 may be configured to determine the location of a UE 105 by using access nodes, which may include NR NodeB (gNB) 210-1 and 210-2 (collectively and generically referred to herein as gNBs 210), ng-eNB 214, and/or WLAN 216 to implement one or more positioning methods. The gNBs 210 and/or the ng-eNB 214 may correspond with base stations 120 of FIG. 1, and the WLAN 216 may correspond with one or more access points 130 of FIG. 1. Optionally, the 5G NR positioning system 200 additionally may be configured to determine the location of a UE 105 by using an LMF 220 (which may correspond with location server 160) to implement the one or more positioning methods. Here, the 5G NR positioning system 200 comprises a UE 105, and components of a 5G NR network comprising a Next Generation (NG) Radio Access Network (RAN) (NG-RAN) 235 and a 5G Core Network (5G CN) 240. A 5G network may also be referred to as an NR network; NG-RAN 235 may be referred to as a 5G RAN or as an NR RAN; and 5G CN 240 may be referred to as an NG Core network. The 5G NR positioning system 200 may further utilize information from GNSS satellites 110 from a GNSS system like Global Positioning System (GPS) or similar system (e.g. GLONASS, Galileo, Beidou, Indian Regional Navigational Satellite System (IRNSS)). Additional components of the 5G NR positioning system 200 are described below. The 5G NR positioning system 200 may include additional or alternative components.

It should be noted that FIG. 2 provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the 5G NR positioning system 200. Similarly, the 5G NR positioning system 200 may include a larger (or smaller) number of GNSS satellites 110, gNBs 210, ng-eNBs 214, Wireless Local Area Networks (WLANs) 216, Access and mobility Management Functions (AMF)s 215, external clients 230, and/or other components. The illustrated connections that connect the various components in the 5G NR positioning system 200 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 105 may comprise and/or be referred to as a device, a mobile device, a wireless device, a mobile terminal, a terminal, a mobile station (MS), a Secure User Plane Location (SUPL)-Enabled Terminal (SET), or by some other name. Moreover, UE 105 may correspond to a cellphone, smartphone, laptop, tablet, personal data assistant (PDA), navigation device, Internet of Things (IoT) device, or some other portable or moveable device. Typically, though not necessarily, the UE 105 may support wireless communication using one or more Radio Access Technologies (RATs) such as using GSM, CDMA, W-CDMA, LTE, High Rate Packet Data (HRPD), IEEE 802.11 Wi-Fi®, Bluetooth, Worldwide Interoperability for Microwave Access (WiMAX™), 5G NR (e.g., using the NG-RAN 235 and 5G CN 240), etc. The UE 105 may also support wireless communication using a WLAN 216 which (like the one or more RATs, and as previously noted with respect to FIG. 1) may connect to other networks, such as the Internet. The use of one or more of these RATs may allow the UE 105 to communicate with an external client 230 (e.g., via elements of 5G CN 240 not shown in FIG. 2, or possibly via a Gateway Mobile Location Center (GMLC) 225) and/or allow the external client 230 to receive location information regarding the UE 105 (e.g., via the GMLC 225). The external client 230 of FIG. 2 may correspond to external client 180 of FIG. 1, as implemented in or communicatively coupled with a 5G NR network.

The UE 105 may include a single entity or may include multiple entities, such as in a personal area network where a user may employ audio, video and/or data I/O devices, and/or body sensors and a separate wireline or wireless modem. An estimate of a location of the UE 105 may be referred to as a location, location estimate, location fix, fix, position, position estimate, or position fix, and may be geodetic, thus providing location coordinates for the UE 105 (e.g., latitude and longitude), which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geodetically or in civic form) within which the UE 105 is expected to be located with some probability or confidence level (e.g., 67%, 95%, etc.). A location of the UE 105 may further be a relative location comprising, for example, a distance and direction or relative X, Y (and Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local X, Y, and possibly Z coordinates and then, if needed, convert the local coordinates into absolute ones (e.g. for latitude, longitude and altitude above or below mean sea level).

Base stations in the NG-RAN 235 shown in FIG. 2 may correspond to base stations 120 in FIG. 1 and may include gNBs 210. Pairs of gNBs 210 in NG-RAN 235 may be connected to one another (e.g., directly as shown in FIG. 2 or indirectly via other gNBs 210). The communication interface between base stations (gNBs 210 and/or ng-eNB 214) may be referred to as an Xn interface 237. Access to the 5G network is provided to UE 105 via wireless communication between the UE 105 and one or more of the gNBs 210, which may provide wireless communications access to the 5G CN 240 on behalf of the UE 105 using 5G NR. The wireless interface between base stations (gNBs 210 and/or ng-eNB 214) and the UE 105 may be referred to as a Uu interface 239. 5G NR radio access may also be referred to as NR radio access or as 5G radio access. In FIG. 2, the serving gNB for UE 105 is assumed to be gNB 210-1, although other gNBs (e.g. gNB 210-2) may act as a serving gNB if UE 105 moves to another location or may act as a secondary gNB to provide additional throughput and bandwidth to UE 105.

Base stations in the NG-RAN 235 shown in FIG. 2 may also or instead include a next generation evolved Node B, also referred to as an ng-eNB, 214. Ng-eNB 214 may be connected to one or more gNBs 210 in NG-RAN 235—e.g. directly or indirectly via other gNBs 210 and/or other ng-eNBs. An ng-eNB 214 may provide LTE wireless access and/or evolved LTE (eLTE) wireless access to UE 105. Some gNBs 210 (e.g. gNB 210-2) and/or ng-eNB 214 in FIG. 2 may be configured to function as positioning-only beacons which may transmit signals (e.g., Positioning Reference Signal (PRS)) and/or may broadcast assistance data to assist positioning of UE 105 but may not receive signals from UE 105 or from other UEs. Some gNBs 210 (e.g., gNB 210-2 and/or another gNB not shown) and/or ng-eNB 214 may be configured to function as detecting-only nodes may scan for signals containing, e.g., PRS data, assistance data, or other location data. Such detecting-only nodes may not transmit signals or data to UEs but may transmit signals or data (relating to, e.g., PRS, assistance data, or other location data) to other network entities (e.g., one or more components of 5G CN 240, external client 230, or a controller) which may receive and store or use the data for positioning of at least UE 105. It is noted that while only one ng-eNB 214 is shown in FIG. 2, some embodiments may include multiple ng-eNBs 214. Base stations (e.g., gNBs 210 and/or ng-eNB 214) may communicate directly with one another via an Xn communication interface. Additionally or alternatively, base stations may communicate directly or indirectly with other components of the 5G NR positioning system 200, such as the LMF 220 and AMF 215.

5G NR positioning system 200 may also include one or more WLANs 216 which may connect to a Non-3GPP InterWorking Function (N3IWF) 250 in the 5G CN 240 (e.g., in the case of an untrusted WLAN 216). For example, the WLAN 216 may support IEEE 802.11 Wi-Fi access for UE 105 and may comprise one or more Wi-Fi APs (e.g., APs 130 of FIG. 1). Here, the N3IWF 250 may connect to other elements in the 5G CN 240 such as AMF 215. In some embodiments, WLAN 216 may support another RAT such as Bluetooth. The N3IWF 250 may provide support for secure access by UE 105 to other elements in 5G CN 240 and/or may support interworking of one or more protocols used by WLAN 216 and UE 105 to one or more protocols used by other elements of 5G CN 240 such as AMF 215. For example, N3IWF 250 may support IPSec tunnel establishment with UE 105, termination of IKEv2/IPSec protocols with UE 105, termination of N2 and N3 interfaces to 5G CN 240 for control plane and user plane, respectively, relaying of uplink (UL) and downlink (DL) control plane Non-Access Stratum (NAS) signaling between UE 105 and AMF 215 across an N1 interface. In some other embodiments, WLAN 216 may connect directly to elements in 5G CN 240 (e.g. AMF 215 as shown by the dashed line in FIG. 2) and not via N3IWF 250. For example, direct connection of WLAN 216 to 5GCN 240 may occur if WLAN 216 is a trusted WLAN for 5GCN 240 and may be enabled using a Trusted WLAN Interworking Function (TWIF) (not shown in FIG. 2) which may be an element inside WLAN 216. It is noted that while only one WLAN 216 is shown in FIG. 2, some embodiments may include multiple WLANs 216.

Access nodes may comprise any of a variety of network entities enabling communication between the UE 105 and the AMF 215. As noted, this can include gNBs 210, ng-eNB 214, WLAN 216, and/or other types of cellular base stations. However, access nodes providing the functionality described herein may additionally or alternatively include entities enabling communications to any of a variety of RATs not illustrated in FIG. 2, which may include non-cellular technologies. Thus, the term "access node," as used in the embodiments described herein below, may include but is not necessarily limited to a gNB 210, ng-eNB 214 or WLAN 216.

In some embodiments, an access node, such as a gNB 210, ng-eNB 214, and/or WLAN 216 (alone or in combination with other components of the 5G NR positioning system 200), may be configured to, in response to receiving a request for location information from the LMF 220, obtain location measurements of uplink (UL) signals received from the UE 105) and/or obtain downlink (DL) location measurements from the UE 105 that were obtained by UE 105 for DL signals received by UE 105 from one or more access nodes. As noted, while FIG. 2 depicts access nodes (gNB 210, ng-eNB 214, and WLAN 216) configured to communicate according to 5G NR, LTE, and Wi-Fi communication protocols, respectively, access nodes configured to communicate according to other communication protocols may be used, such as, for example, a Node B using a Wideband Code Division Multiple Access (WCDMA) protocol for a Universal Mobile Telecommunications Service (UMTS) Terrestrial Radio Access Network (UTRAN), an eNB using an LTE protocol for an Evolved UTRAN (E-UTRAN), or a Bluetooth® beacon using a Bluetooth protocol for a WLAN. For example, in a 4G Evolved Packet System (EPS) providing LTE wireless access to UE 105, a RAN may comprise an E-UTRAN, which may comprise base stations comprising eNBs supporting LTE wireless access. A core network for EPS may comprise an Evolved Packet Core (EPC). An EPS may then comprise an E-UTRAN plus an EPC, where the E-UTRAN corresponds to NG-RAN 235 and the EPC corresponds to 5GCN 240 in FIG. 2. The methods and techniques described herein for obtaining a civic location for UE 105 may be applicable to such other networks.

The gNBs 210 and ng-eNB 214 can communicate with an AMF 215, which, for positioning functionality, communicates with an LMF 220. The AMF 215 may support mobility of the UE 105, including cell change and handover of UE 105 from an access node (e.g., gNB 210, ng-eNB 214, or WLAN 216) of a first RAT to an access node of a second RAT. The AMF 215 may also participate in supporting a signaling connection to the UE 105 and possibly data and voice bearers for the UE 105. The LMF 220 may support positioning of the UE 105 using a CP location solution when UE 105 accesses the NG-RAN 235 or WLAN 216 and may support position procedures and methods, including UE assisted/UE based and/or network based procedures/methods, such as Assisted GNSS (A-GNSS), Observed Time Difference Of Arrival (OTDOA) (which may be referred to in NR as Time Difference Of Arrival (TDOA)), Real Time Kinematic (RTK), Precise Point Positioning (PPP), Differential GNSS (DGNSS), Enhance Cell ID (ECID), angle of arrival (AoA), angle of departure (AoD), WLAN positioning, round trip signal propagation delay (RTT), multi-cell RTT, and/or other positioning procedures and methods. The LMF 220 may also process location service requests for the UE 105, e.g., received from the AMF 215 or from the GMLC 225. The LMF 220 may be connected to AMF 215 and/or to GMLC 225. In some embodiments, a network such as 5GCN 240 may additionally or alternatively implement other types of location-support modules, such as an Evolved Serving Mobile Location Center (E-SMLC) or a SUPL Location Platform (SLP). It is noted that in some embodiments, at least part of the positioning functionality (including determination of a UE 105's location) may be performed at the UE 105 (e.g., by measuring downlink PRS (DL-PRS) signals transmitted by wireless nodes such as gNBs 210, ng-eNB 214 and/or WLAN 216, and/or using assistance data provided to the UE 105, e.g., by LMF 220).

The Gateway Mobile Location Center (GMLC) 225 may support a location request for the UE 105 received from an external client 230 and may forward such a location request to the AMF 215 for forwarding by the AMF 215 to the LMF 220. A location response from the LMF 220 (e.g., containing a location estimate for the UE 105) may be similarly returned to the GMLC 225 either directly or via the AMF 215, and the GMLC 225 may then return the location response (e.g., containing the location estimate) to the external client 230.

A Network Exposure Function (NEF) 245 may be included in 5GCN 240. The NEF 245 may support secure exposure of capabilities and events concerning 5GCN 240 and UE 105 to the external client 230, which may then be referred to as an Access Function (AF) and may enable secure provision of information from external client 230 to 5GCN 240. NEF 245 may be connected to AMF 215 and/or to GMLC 225 for the purposes of obtaining a location (e.g. a civic location) of UE 105 and providing the location to external client 230.

As further illustrated in FIG. 2, the LMF 220 may communicate with the gNBs 210 and/or with the ng-eNB 214 using an NR Positioning Protocol annex (NRPPa) as defined in 3GPP Technical Specification (TS) 38.455. NRPPa messages may be transferred between a gNB 210 and the LMF 220, and/or between an ng-eNB 214 and the LMF 220, via the AMF 215. As further illustrated in FIG. 2, LMF 220 and UE 105 may communicate using an LTE Positioning Protocol (LPP) as defined in 3GPP TS 37.355. Here, LPP messages may be transferred between the UE 105 and the LMF 220 via the AMF 215 and a serving gNB 210-1 or serving ng-eNB 214 for UE 105. For example, LPP messages may be transferred between the LMF 220 and the AMF 215 using messages for service-based operations (e.g., based on the Hypertext Transfer Protocol (HTTP)) and may be transferred between the AMF 215 and the UE 105 using a 5G NAS protocol. The LPP protocol may be used to support positioning of UE 105 using UE assisted and/or UE based position methods such as A-GNSS, RTK, TDOA, multi-cell RTT, AoD, and/or ECID. The NRPPa protocol may be used to support positioning of UE 105 using network based position methods such as ECID, AoA, uplink TDOA (UL-TDOA) and/or may be used by LMF 220 to obtain location related information from gNBs 210 and/or ng-eNB 214, such as parameters defining DL-PRS transmission from gNBs 210 and/or ng-eNB 214.

In the case of UE 105 access to WLAN 216, LMF 220 may use NRPPa and/or LPP to obtain a location of UE 105 in a similar manner to that just described for UE 105 access to a gNB 210 or ng-eNB 214. Thus, NRPPa messages may be transferred between a WLAN 216 and the LMF 220, via the AMF 215 and N3IWF 250 to support network-based positioning of UE 105 and/or transfer of other location information from WLAN 216 to LMF 220. Alternatively, NRPPa messages may be transferred between N3IWF 250 and the LMF 220, via the AMF 215, to support network-based positioning of UE 105 based on location related information and/or location measurements known to or accessible to N3IWF 250 and transferred from N3IWF 250 to LMF 220 using NRPPa. Similarly, LPP and/or LPP messages may be transferred between the UE 105 and the LMF 220 via the AMF 215, N3IWF 250, and serving WLAN 216 for UE 105 to support UE assisted or UE based positioning of UE 105 by LMF 220.

In a 5G NR positioning system 200, positioning methods can be categorized as being "UE assisted" or "UE based." This may depend on where the request for determining the position of the UE 105 originated. If, for example, the request originated at the UE (e.g., from an application, or "app," executed by the UE), the positioning method may be categorized as being UE based. If, on the other hand, the request originates from an external client or AF 230, LMF 220, or other device or service within the 5G network, the positioning method may be categorized as being UE assisted (or "network-based").

With a UE-assisted position method, UE 105 may obtain location measurements and send the measurements to a location server (e.g., LMF 220) for computation of a location estimate for UE 105. For RAT-dependent position methods location measurements may include one or more of a Received Signal Strength Indicator (RSSI), Round Trip signal propagation Time (RTT), Reference Signal Received Power (RSRP), Reference Signal Received Quality (RSRQ), Reference Signal Time Difference (RSTD), Time of Arrival (TOA), AoA, Receive Time-Transmission Time Difference (Rx-Tx), Differential AoA (DAoA), AoD, or Timing Advance (TA) for gNBs 210, ng-eNB 214, and/or one or more access points for WLAN 216. Additionally or alternatively, similar measurements may be made of sidelink signals transmitted by other UEs, which may serve as anchor points for positioning of the UE 105 if the positions of the other UEs are known. The location measurements may also or instead include measurements for RAT-independent positioning methods such as GNSS (e.g., GNSS pseudorange, GNSS code phase, and/or GNSS carrier phase for GNSS satellites 110), WLAN, etc.

With a UE-based position method, UE 105 may obtain location measurements (e.g., which may be the same as or similar to location measurements for a UE assisted position method) and may further compute a location of UE 105 (e.g., with the help of assistance data received from a location server such as LMF 220, an SLP, or broadcast by gNBs 210, ng-eNB 214, or WLAN 216).

With a network based position method, one or more base stations (e.g., gNBs 210 and/or ng-eNB 214), one or more APs (e.g., in WLAN 216), or N3IWF 250 may obtain location measurements (e.g., measurements of RSSI, RTT, RSRP, RSRQ, AoA, or TOA) for signals transmitted by UE 105, and/or may receive measurements obtained by UE 105 or by an AP in WLAN 216 in the case of N3IWF 250, and may send the measurements to a location server (e.g., LMF 220) for computation of a location estimate for UE 105.

Positioning of the UE 105 also may be categorized as UL, DL, or DL-UL based, depending on the types of signals used for positioning. If, for example, positioning is based solely on signals received at the UE 105 (e.g., from a base station or other UE), the positioning may be categorized as DL based. On the other hand, if positioning is based solely on signals transmitted by the UE 105 (which may be received by a base station or other UE, for example), the positioning may be categorized as UL based. Positioning that is DL-UL based includes positioning, such as RTT-based positioning, that is based on signals that are both transmitted and received by the UE 105. Sidelink (SL)-assisted positioning comprises signals communicated between the UE 105 and one or more other UEs. According to some embodiments, UL, DL, or DL-UL positioning as described herein may be capable of using SL signaling as a complement or replacement of SL, DL, or DL-UL signaling.

Depending on the type of positioning (e.g., UL, DL, or DL-UL based) the types of reference signals used can vary. For DL-based positioning, for example, these signals may comprise PRS (e.g., DL-PRS transmitted by base stations or SL-PRS transmitted by other UEs), which can be used for TDOA, AoD, and RTT measurements. Other reference signals that can be used for positioning (UL, DL, or DL-UL) may include Sounding Reference Signal (SRS), Channel State Information Reference Signal (CSI-RS), synchronization signals (e.g., synchronization signal block (SSB) Synchronizations Signal (SS)), Physical Uplink Control Channel (PUCCH), Physical Uplink Shared Channel (PUSCH), Physical Sidelink Shared Channel (PSSCH), Demodulation Reference Signal (DMRS), etc. Moreover, reference signals may be transmitted in a Tx beam and/or received in an Rx beam (e.g., using beamforming techniques), which may impact angular measurements, such as AoD and/or AoA.

Figure 3:
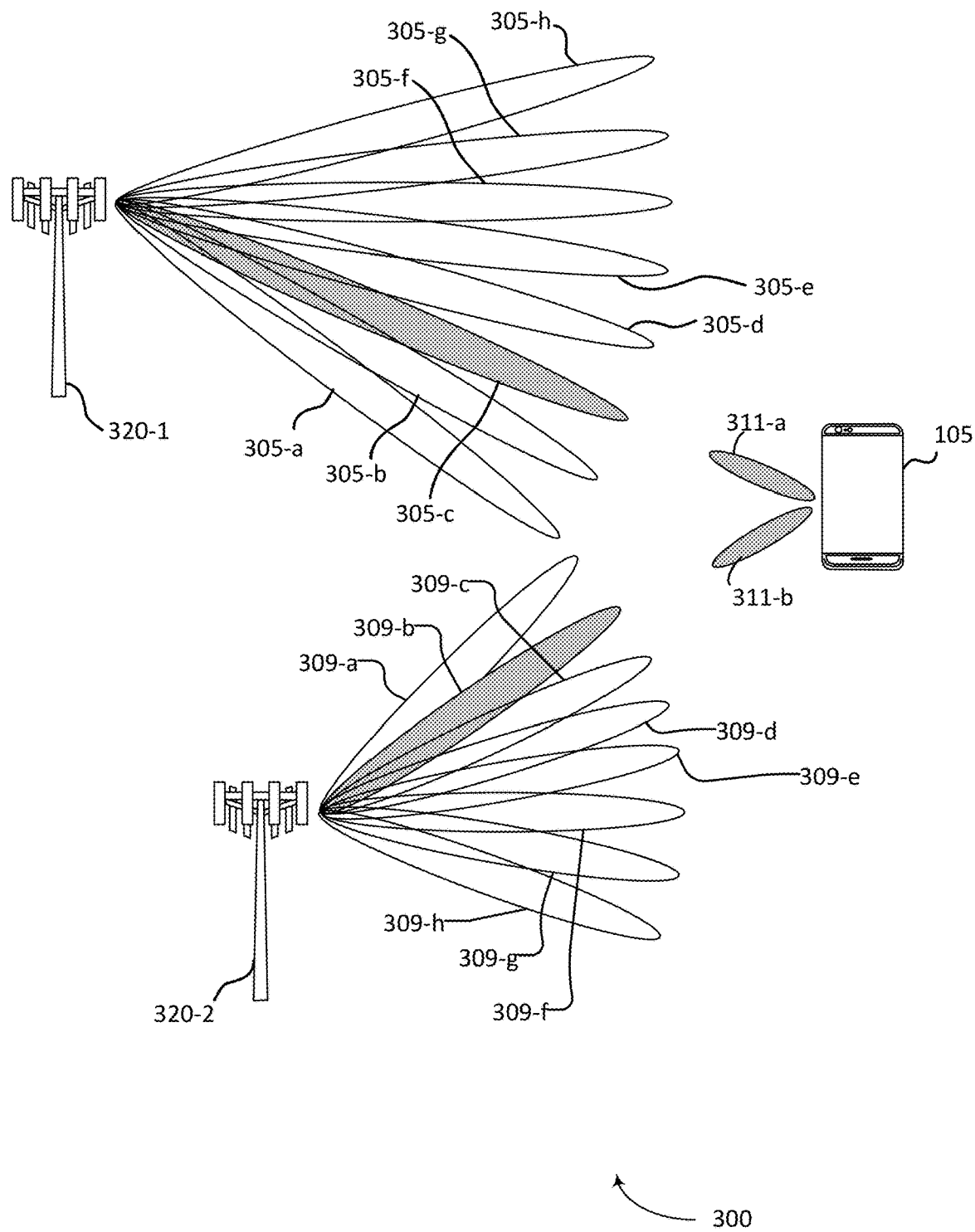
FIG. 3 is a diagram illustrating an example of beamforming that can be used by difference devices, according to some embodiments.

FIG. 3 is a diagram illustrating a simplified environment 300 including two TRPs 320-1 and 320-2 (which may correspond to base stations 120 of FIG. 1 and/or gNBs 210 and/or ng-eNB 214 of FIG. 2) with antenna arrays that can perform beamforming to produce directional beams for transmitting and/or receiving RF signals. FIG. 3 also illustrates a UE 105, which may also use beamforming for transmitting and/or receiving RF signals. Such directional beams are used in 5G NR wireless communication networks. Each of the directional beam may have a beam width centered in a different direction, enabling different beams of a TRP 320 to correspond with different areas within a coverage area for the TRP 320.

Different modes of operation may enable TRPs 320-1 and 320-2 to use a larger or smaller number of beams. For example, in a first mode of operation, a TRP 320 may use 16 beams, in which case each beam may have a relatively wide beam width. In a second mode of operation, a TRP 320 may use 64 beams, in which case each beam may have a relatively narrow beam width. Depending on the capabilities of a TRP 320, the TRP may use any number of beams the TRP 320 may be capable of forming. The modes of operation and/or number of beams may be defined in relevant wireless standards and may correspond to different directions in either or both azimuth and elevation (e.g., horizontal and vertical directions). Different modes of operation may be used to transmit and/or receive different signal types. Additionally or alternatively, the UE 105 may be capable of using different numbers of beams, which may also correspond to different modes of operation, signal types, etc.

In some situations, a TRP 320 may use beam sweeping. Beam sweeping is a process in which the TRP 320 may send an RF signal in different directions using different respective beams, often in succession, effectively "sweeping" across a coverage area. For example, a TRP 320 may sweep across 120 or 360 degrees in an azimuth direction, for each beam sweep, which may be periodically repeated. Each direction beam can include an RF reference signal (e.g., a PRS resource), where TRP 320-1 produces a set of RF reference signals that includes Tx beams 305-$a$, 305-$b$, 305-$c$, 305-$d$, 305-$e$, 305-$f$, 305-$g$, and 305-$h$, and the TRP 320-2 produces a set of RF reference signals that includes Tx beams 309-$a$, 309-$b$, 309-$c$, 309-$d$, 309-$e$, 309-$f$, 309-$g$, and 309-$h$. As noted, because UE 320 may also include an antenna array, it can receive RF reference signals transmitted by TRPs 320-1 and 320-2 using beamforming to form respective receive beams (Rx beams) 311-$a$ and 311-$b$. Beamforming in this manner (by TRPs 320 and optionally by UEs 105) can be used to make communications more efficient. They can also be used for other purposes, including taking measurements for position determination (e.g., AoD and AoA measurements).

Figure 4:
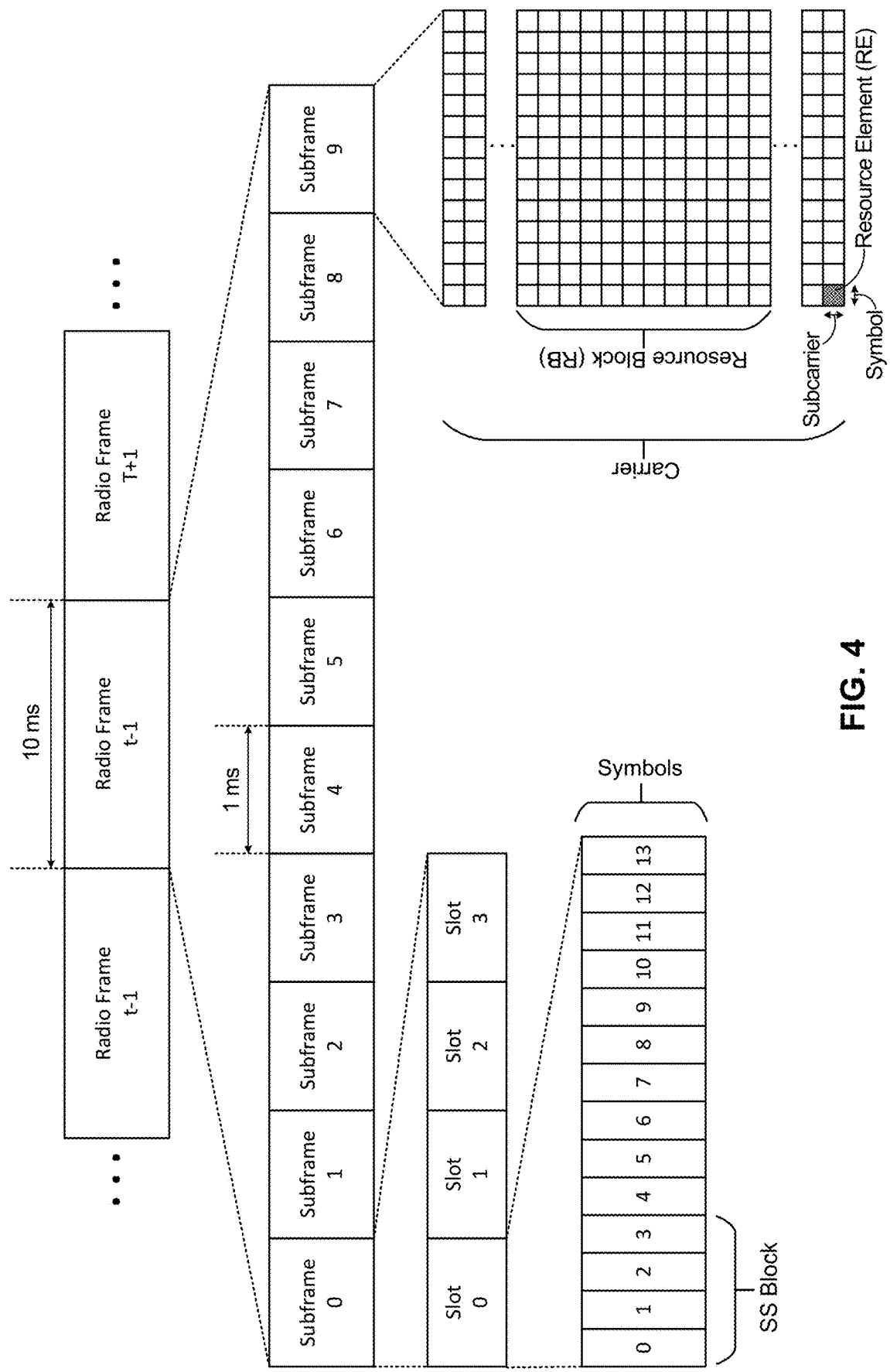
FIG. 4 is a diagram showing an example of a frame structure for NR and associated terminology.

FIG. 4 is a diagram showing an example of a frame structure for NR and associated terminology, which can serve as the basis for physical layer communication between the UE 105 and base stations/TRPs. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini slot may comprise a sub slot structure (e.g., 2, 3, or 4 symbols). Additionally shown in FIG. 4 is the complete Orthogonal Frequency-Division Multiplexing (OFDM) of a subframe, showing how a subframe can be divided across both time and frequency into a plurality of Resource Blocks (RBs). A single RB can comprise a grid of Resource Elements (REs) spanning 14 symbols and 12 subcarriers.

Each symbol in a slot may indicate a link direction (e.g., downlink (DL), uplink (UL), or flexible) or data transmission and the link direction for each subframe may be dynamically switched. The link directions may be based on the slot format. Each slot may include DL/UL data as well as DL/UL control information. In NR, a synchronization signal (SS) block is transmitted. The SS block includes a primary SS (PSS), a secondary SS (SSS), and a two symbol Physical Broadcast Channel (PBCH). The SS block can be transmitted in a fixed slot location, such as the symbols 0-3 as shown in FIG. 4. The PSS and SSS may be used by UEs for cell search and acquisition. The PSS may provide half-frame timing, the SS may provide the cyclic prefix (CP) length and frame timing. The PSS and SSS may provide the cell identity. The PBCH carries some basic system information, such as downlink system bandwidth, timing information within radio frame, SS burst set periodicity, system frame number, etc.

Figure 5:
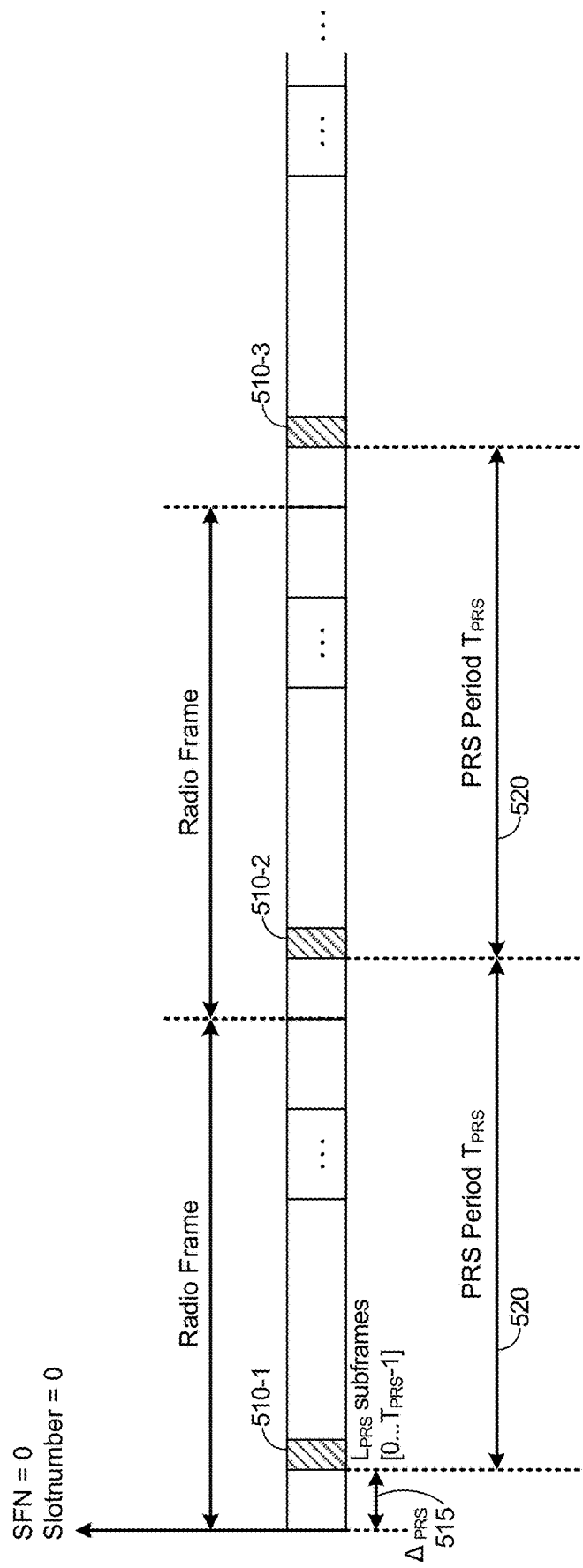
FIG. 5 is a diagram showing an example of a radio frame sequence with Positioning Reference Signal (PRS) positioning occasions.

FIG. 5 is a diagram showing an example of a radio frame sequence 500 with PRS positioning occasions. A "PRS instance" or "PRS occasion" is one instance of a periodically repeated time window (e.g., a group of one or more consecutive slots) where PRS are expected to be transmitted. A PRS occasion may also be referred to as a "PRS positioning occasion," a "PRS positioning instance, a "positioning occasion," "a positioning instance," or simply an "occasion" or "instance." Subframe sequence 500 may be applicable to broadcast of PRS signals (DL-PRS signals) from base stations 120 in positioning system 100. The radio frame sequence 500 may be used in 5G NR (e.g., in 5G NR positioning system 200) and/or in LTE. Similar to FIG. 4, time is represented horizontally (e.g., on an X axis) in FIG. 5, with time increasing from left to right. Frequency is represented vertically (e.g., on a Y axis) with frequency increasing (or decreasing) from bottom to top.

FIG. 5 shows how PRS positioning occasions 510-1, 510-2, and 510-3 (collectively and generically referred to herein as positioning occasions 510) are determined by a System Frame Number (SFN), a cell-specific subframe offset ($\Delta_{PRS}$) 515, a length or span of $L_{PRS}$ subframes, and the PRS Periodicity ($T_{PRS}$) 520. The cell-specific PRS subframe configuration may be defined by a "PRS Configuration Index," $I_{PRS}$, included in assistance data (e.g., TDOA assistance data), which may be defined by governing 3GPP standards. The cell-specific subframe offset ($\Delta_{PRS}$) 515 may be defined in terms of the number of subframes transmitted starting from System Frame Number (SFN) 0 to the start of the first (subsequent) PRS positioning occasion.

A PRS may be transmitted by wireless nodes (e.g., base stations 120) after appropriate configuration (e.g., by an Operations and Maintenance (O&M) server). A PRS may be transmitted in special positioning subframes or slots that are grouped into positioning occasions 510. For example, a PRS positioning occasion 510-1 can comprise a number $N_{PRS}$ of consecutive positioning subframes where the number $N_{PRS}$ may be between 1 and 160 (e.g., may include the values 1, 2, 4 and 6 as well as other values). PRS occasions 510 may be grouped into one or more PRS occasion groups. As noted, PRS positioning occasions 510 may occur periodically at intervals, denoted by a number $T_{PRS}$, of millisecond (or subframe) intervals where $T_{PRS}$ may equal 5, 10, 20, 40, 80, 160, 320, 640, or 1280 (or any other appropriate value). In some embodiments, $T_{PRS}$ may be measured in terms of the number of subframes between the start of consecutive positioning occasions.

In some embodiments, when a UE 105 receives a PRS configuration index $I_{PRS}$ in the assistance data for a particular cell (e.g., base station), the UE 105 may determine the PRS periodicity $T_{PRS}$ 520 and cell-specific subframe offset ($\Delta_{PRS}$) 515 using stored indexed data. The UE 105 may then determine the radio frame, subframe, and slot when a PRS is scheduled in the cell. The assistance data may be determined by, for example, a location server (e.g., location server 160 in FIG. 1 and/or LMF 220 in FIG. 2), and includes assistance data for a reference cell, and a number of neighbor cells supported by various wireless nodes.

Typically, PRS occasions from all cells in a network that use the same frequency are aligned in time and may have a fixed known time offset (e.g., cell-specific subframe offset ($\Delta_{PRS}$) 515) relative to other cells in the network that use a different frequency. In SFN-synchronous networks all wireless nodes (e.g., base stations 120) may be aligned on both frame boundary and system frame number. Therefore, in SFN-synchronous networks all cells supported by the various wireless nodes may use the same PRS configuration index for any particular frequency of PRS transmission. On the other hand, in SFN-asynchronous networks, the various wireless nodes may be aligned on a frame boundary, but not system frame number. Thus, in SFN-asynchronous networks the PRS configuration index for each cell may be configured separately by the network so that PRS occasions align in time. A UE 105 may determine the timing of the PRS occasions 510 of the reference and neighbor cells for TDOA positioning, if the UE 105 can obtain the cell timing (e.g., SFN or Frame Number) of at least one of the cells, e.g., the reference cell or a serving cell. The timing of the other cells may then be derived by the UE 105 based, for example, on the assumption that PRS occasions from different cells overlap.

With reference to the frame structure in FIG. 4, a collection of REs that are used for transmission of PRS is referred to as a "PRS resource." The collection of resource elements can span multiple RBs in the frequency domain and one or more consecutive symbols within a slot in the time domain, inside which pseudo-random Quadrature Phase Shift Keying (QPSK) sequences are transmitted from an antenna port of a TRP. In a given OFDM symbol in the time domain, a PRS resource occupies consecutive RBs in the frequency domain. The transmission of a PRS resource within a given RB has a particular combination, or "comb," size. (Comb size also may be referred to as the "comb density.") A comb size "N" represents the subcarrier spacing (or frequency/tone spacing) within each symbol of a PRS resource configuration, where the configuration uses every Nth subcarrier of certain symbols of an RB. For example, for comb-4, for each of the four symbols of the PRS resource configuration, REs corresponding to every fourth subcarrier (e.g., subcarriers 0, 4, 8) are used to transmit PRS of the PRS resource. Comb sizes of comb-2, comb-4, comb-6, and comb-12, for example, may be used in PRS. Examples of different comb sizes using with different numbers of symbols are provided in FIG. 6.

A "PRS resource set" comprises a group of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a cell ID). A "PRS resource repetition" is a repetition of a PRS resource during a PRS occasion/instance. The number of repetitions of a PRS resource may be defined by a "repetition factor" for the PRS resource. In addition, the PRS resources in a PRS resource set may have the same periodicity, a common muting pattern configuration, and the same repetition factor across slots. The periodicity may have a length selected from $2^m \cdot \{4, 5, 8, 10, 16, 20, 32, 40, 64, 80, 160, 320, 640, 1280, 2560, 5120, 10240\}$ slots, with $\mu=0, 1, 2, 3$. The repetition factor may have a length selected from $\{1, 2, 4, 6, 8, 16, 32\}$ slots.

A PRS resource ID in a PRS resource set may be associated with a single beam (and/or beam ID) transmitted from a single TRP (where a TRP may transmit one or more beams). That is, each PRS resource of a PRS resource set may be transmitted on a different beam, and as such, a PRS resource (or simply "resource") can also be referred to as a "beam." Note that this does not have any implications on whether the TRPs and the beams on which PRS are transmitted are known to the UE.

In the 5G NR positioning system 200 illustrated in FIG. 2, a TRP (gNB 210, ng-eNB 214, and/or WLAN 216) may transmit frames, or other physical layer signaling sequences, supporting PRS signals (i.e. a DL-PRS) according to frame configurations as previously described, which may be measured and used for position determination of the UE 105. As noted, other types of wireless network nodes, including other UEs, may also be configured to transmit PRS signals configured in a manner similar to (or the same as) that described above. Because transmission of a PRS by a wireless network node may be directed to all UEs within radio range, the wireless network node may be considered to transmit (or broadcast) a PRS.

Figure 7:
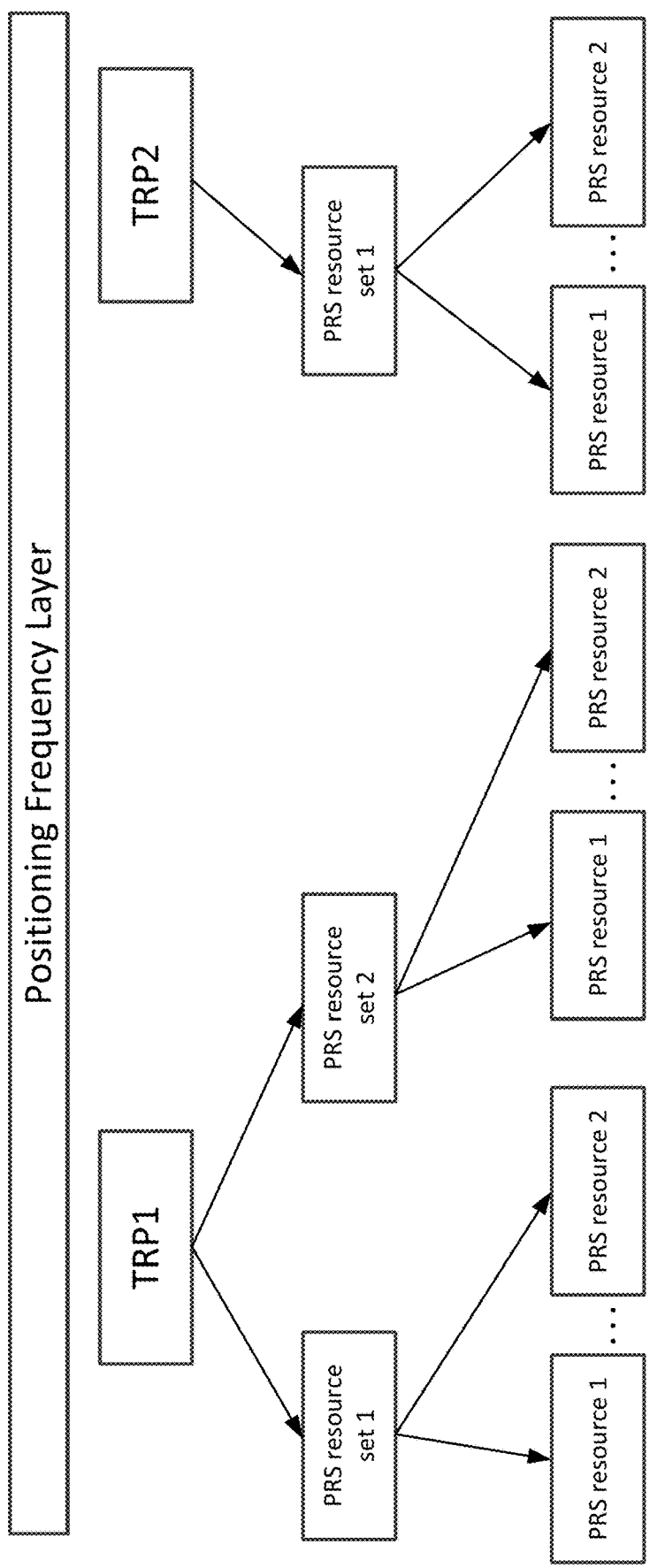
FIG. 7 is as a diagram of a hierarchical structure of how PRS resources and PRS resource sets may be used by different Transmission Reception Point (TRPs) of a given position frequency layer (PFL), as defined in 5G NR.

FIG. 7 is a diagram of a hierarchical structure of how PRS resources and PRS resource sets may be used by different TRPs of a given position frequency layer (PFL), as defined in 5G NR. With respect to a network (Uu) interface, a UE 105 can be configured with one or more DL-PRS resource sets from each of one or more TRPs. Each DL-PRS resource set includes K>1 DL-PRS resource(s), which, as previously noted, may correspond to a Tx beam of the TRP. A DL-PRS PFL is defined as a collection of DL-PRS resource sets which have the same subcarrier spacing (SCS) and cyclic prefix (CP) type, the same value of DL-PRS bandwidth, the same center frequency, and the same value of comb size. In current iterations of the NR standard, a UE 105 can be configured with up to four DL-PRS PFLs.

NR has multiple frequency bands across different frequency ranges (e.g., Frequency Range 1 (FR1) and Frequency Range 2 (FR2)). PFLs may be on the same band or different bands. In some embodiments, they may even be in different frequency ranges. Additionally, as illustrated in FIG. 7, multiple TRPs (e.g., TRP1 and TR2) may be on the same PFL. Currently under NR, each TRP can have up to two PRS resource sets, each with one or more PRS resources, as previously described.

Different PRS resource sets may have different periodicity. For example, one PRS resource set may be used for tracking, and another PRS resource that could be used for acquisition. Additionally or alternatively, one PRS resource set may have more beams, and another may have fewer beams. Accordingly, different resource sets may be used by a wireless network for different purposes.

Figure 8:
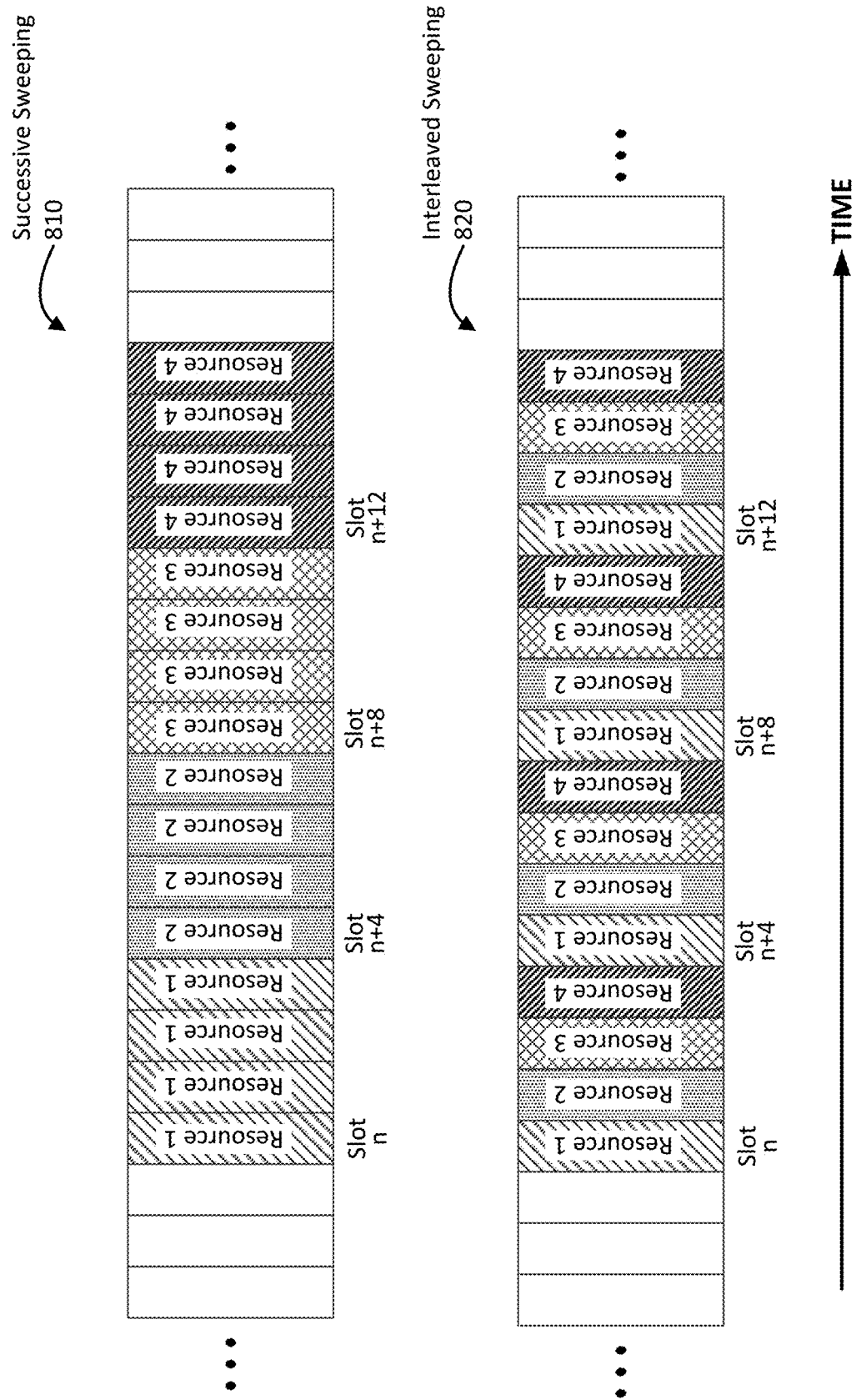
FIG. 8 is a time diagram illustrating two different options for slot usage of a resource set, according to an embodiment.

FIG. 8 is a time diagram illustrating two different options for slot usage of a resource set, according to an embodiment. Because each example repeats each resource four times, the resource set is said to have a repetition factor of four. Successive sweeping 810 comprises repeating a single resource (resource 1, resource 2, etc.) four times before proceeding to a subsequent resource. In this example, if each resource corresponds to a different beam of a TRP, the TRP repeats a beam for four slots in a row before moving to the next beam. Because each resource is repeated in successive slots (e.g., resource 1 is repeated in slots n, n+1, n+2, etc.), the time gap is said to be one slot. On the other hand, for interleaved sweeping 820, the TRP may move from one beam to the next for each subsequent slot, rotating through four beams for four rounds. Because each resource is repeated every four slots (e.g., resource 1 is repeated in slots n, n+4, n+8, etc.), the time gap is said to be one slot. Of course, embodiments are not so limited. Resource sets may comprise a different amount of resources and/or repetitions. Moreover, as noted above, each TRP may have multiple resource sets, multiple TRPs may utilize a single PFL, and a UE may be capable of taking measurements of PRS resources transmitted via multiple PFLs.

Thus, to obtain PRS measurements from PRS signals sent by TRPs and/or UEs in a network, the UE can be configured to observe PRS resources during a period of time called a measurement period. That is, to determine a position of the UE using PRS signals, a UE and a location server (e.g., LMF 220 of FIG. 2) may initiate a location session in which the UE is given a period of time to observe PRS resources and report resulting PRS measurements to the location server. As described in more detail below, this measurement period may be determined based on the capabilities of the UE.

To measure and process PRS resources during the measurement period, a UE can be configured to execute a measurement gap (MG) pattern. The UE can request a measurement gap from a serving TRP, for example, which can then provide the UE with the configuration (e.g., via Radio Resource Control (RRC) protocol).

As noted, a UE may be configured to execute an MG pattern to measure and process PRS resources of a PRS resource set outside an active DL bandwidth part (BWP) via which the UE sends and receives data with a serving TRP. To allow the network to configure the UE in a manner that accommodates the processing and buffering capabilities of the UE (which may be dynamic), the UE may provide to the network (e.g., a TRP or location server) capabilities related to PRS processing. The various parameters of the MG pattern can be configured in view of these capabilities.

Certain conditions may exist, however, where MG occasions may not be needed or when measurements may be made outside an MG occasion. For example, a UE may be capable of measuring reference signals (RS) (e.g., PRS and/or other signals that may be used for positioning) outside an MG, within an RS processing window (PW). This can occur, for example, when a BWP of the RS overlaps, at least partially, with the active DL BWP and has the same numerology as the active DL BWP. In many aspects, a PW is similar to an MG in that it includes designated times for RS reception and processing. To perform the RS measurements and processing inside a PW, a UE may assign a higher priority for the RS operation than other DL/UL reference signal/data.

Performing measurements without using an MG can provide one or more advantages over using an MG. For example, in some instances, because a measured RS may be located within an active BWP, there may be no need to tune RF circuitry (e.g., an RF chain of a transceiver) to a separate BWP, which can save time and increase efficiency. Further, some configurations may allow a UE to continue to receive non-RS data/signaling during the PW, which again can save time and increase efficiency. Additionally or alternatively, a PW may allow a UE to transmit a UL signal, which may not be allowed during a traditional MG. This can be particularly helpful when the positioning of the UE is based on measurements of UL signals (e.g., UL-AoA, RTT, and/or other measurements utilizing UL signals from the UE). Additionally, if a UE is able to measure RS without tuning away from the active BWP, it can continue to communicate with a serving base station. The embodiments disclosed herein utilize a PW, as discussed in more detail hereafter, and may therefore include these and other benefits.

A UE may have different abilities for performing measurements without using an MG. According to a first capability, for example, a UE may be capable of prioritizing an RS (e.g., DL PRS) over other DL signals/channels in all symbols inside the PW. This may affect DL signals/channels from all DL component carriers (CCs), or only the DL signals/channels from a certain band/CC. Additionally or alternatively, a UE may be capable of prioritizing an RS over other DL signals/channels only in the symbols inside the window used to receive the RS. In either case, the UE may be capable of providing capability information (e.g., indicating a capability of performing measurements without an MG) to a serving base station (e.g., serving gNB) and/or location server (e.g., LMF). Furthermore, a UE may determine the priority of an RS based on one or more of an indication/configuration from a serving base station, a rules-based determination (e.g., as dictated from rules of a governing specification), an indication/configuration received from a location server, or the like. Depending on desired functionality, a UE may be capable of obtaining RS measurements both inside and outside a PW for a single position determination.

Coordination of a PW between a serving base station and a UE. Because the UE may measure RS transmitted by one or more other UEs (e.g., in addition or as an alternative to RS transmitted by one or more base stations) the UE taking the measurements (and whose position will be determined) may be referred to herein as the target UE. The one or more other UEs (that transmit signals measured by the target UE), if used, may be referred to herein as anchor UEs. Techniques for configuring and signaling a PW to be used by a target UE for measuring at least one RS may include coordination between the serving base station and UE by configuration or by implicit derivation.

According to a first technique, for example, a network node (e.g., the target UE or location server) may send request to the serving base station of the target UE for configuring a PW. The request may be sent via NRPPa if the network node comprises a location server. If the network node comprises the target UE, the target UE may provide the request via Uplink Control Information (UCI) and/or Medium Access Control-Control Element (MAC-CE).

Figure 9:
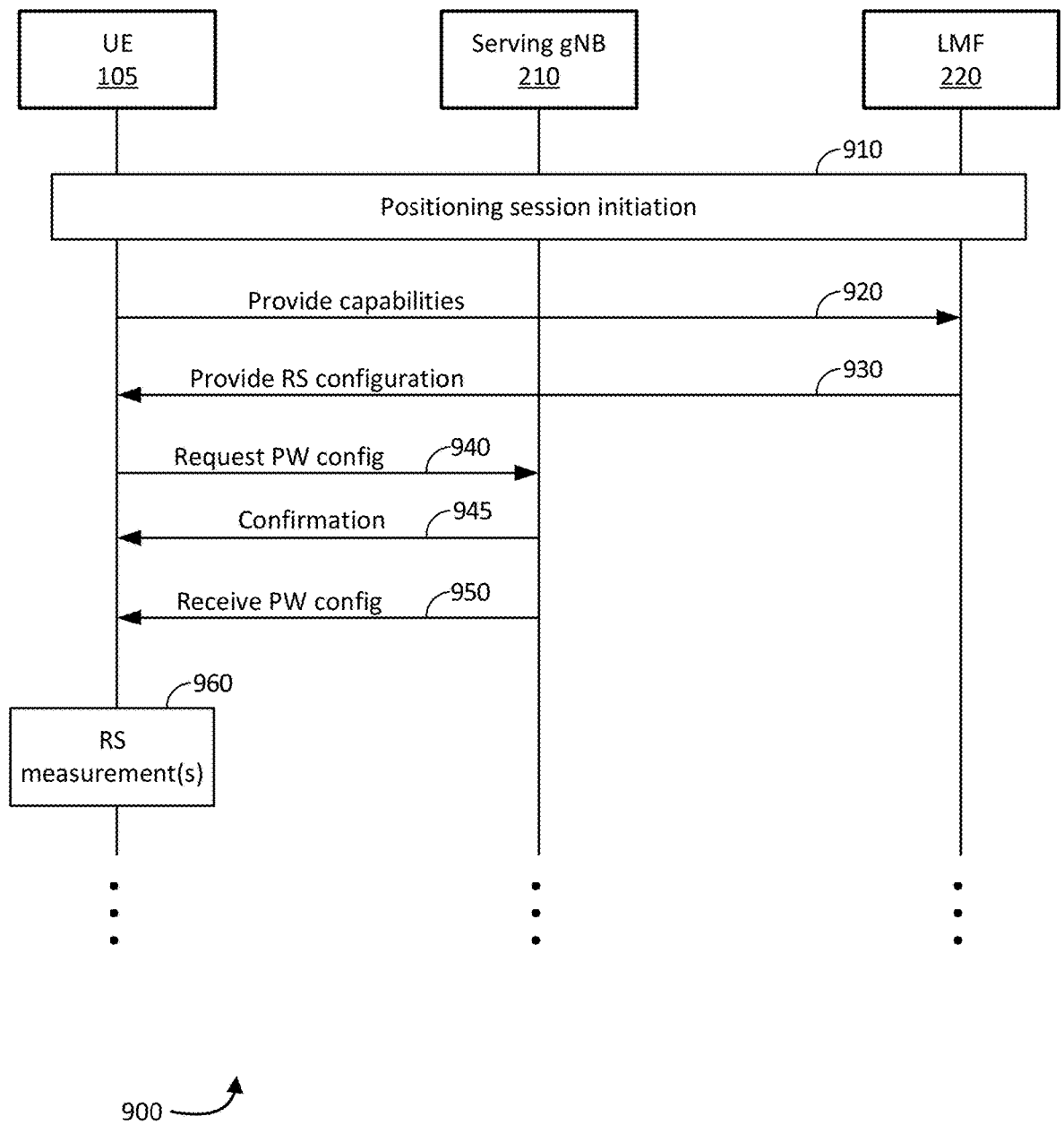
FIGS. 9 and 10 are flow diagrams illustrating examples of how a process including request for a processing window (PW) configuration from a network node may be implemented, according to some embodiments.
Figure 10:
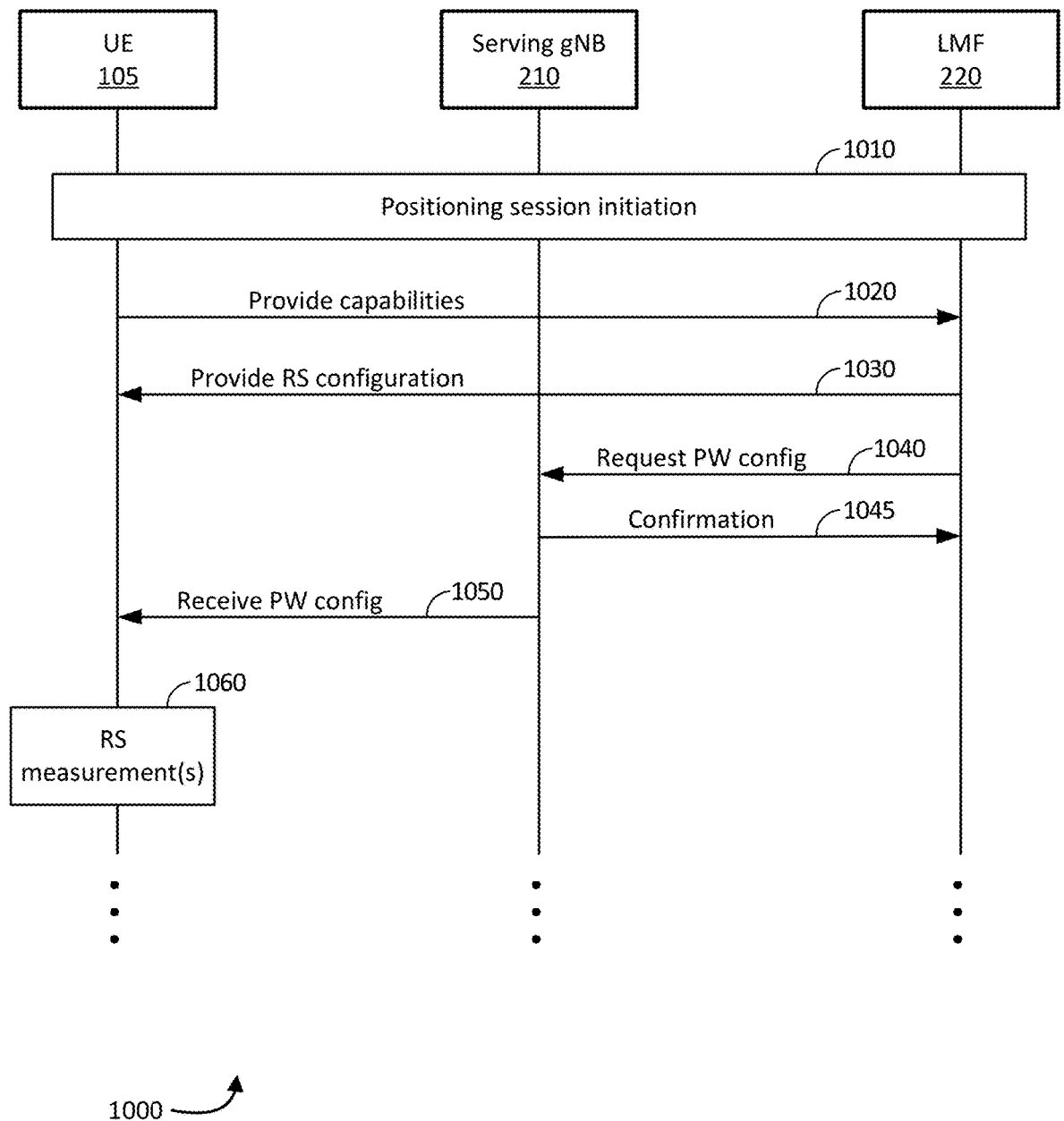

FIGS. 9 and 10 are flow diagrams illustrating examples of how the first technique (PW request from a network node) may be implemented, according to some embodiments. These processes may be part of a positioning session (e.g., LPP positioning session) between the UE 105 and LMF 220, although embodiments herein are not so limited. Communications between the UE 105 and LMF 220 may be relayed by (and transparent to) various devices, including the serving gNB 210, as illustrated in FIG. 2. Furthermore, a positioning session may include additional or alternative steps that are not illustrated in FIG. 9 or 10.

In FIG. 9, the process 900 includes the initiation of a positioning session at block 910. This may include a request for the position of the UE 105 (e.g., initiating a UE-based or UE-assisted positioning session) and a request of capabilities by the LMF 220. At arrow 920, the UE 105 provides capabilities to the LMF 220, including PW-related capabilities as described herein. More specifically, this may include an indication the UE 105 is capable of receiving various PW configurations. At arrow 930, the LMF 220 provides an RS configuration (e.g., DL-PRS configuration) to the UE 105. Because the RS configuration is indicative of when RS may be measured, the UE 105 can determine whether a PW may be used for measuring RS and, if so, request a corresponding PW configuration from the serving gNB 210, as indicated at arrow 940. According to some embodiments, the serving gNB 210 may provide confirmation or acknowledgment of the PW configuration request, as indicated at block 945. Depending on desired functionality, the RS configuration may be included in assistance data provided by the LMF 220. For its part, the serving gNB 210 provides the PW configuration, at arrow 950, and the UE 105 performs one or more corresponding RS measurements using the PW, as indicated at block 960. The measurements further may be in response to a location request (not shown) received from the LMF 220.

FIG. 10 shows an alternative embodiment in which the process 1000 has operations 1010-1060 similar to corresponding operations of process 900 of FIG. 9. However, rather than the UE 105 sending a PW configuration request (arrow 940 of FIG. 9), the LMF 220 sends the PW configuration request to the serving gNB 210 at arrow 1040. This process 1000 may be performed (e.g., rather than the process 900 of FIG. 9) to help reduce bandwidth usage between the UE 105 and a serving gNB 210.

The processes 900 and 1000 of FIGS. 9 and 10 provide a dynamic approach for PW requests and configuration. That is, a PW may be requested and configured on an as-needed basis. Additionally or alternatively, a PW a be configured by the serving gNB 210 providing a list of preconfigured PW configurations to the UE, in which case the UE may activate, deactivate, and/or switch between PW configurations based on the list of preconfigured PW configurations using UCI/MAC-CE/RRC in real time. More specifically, the list of preconfigured PW configurations may comprise a list of PW configurations preconfigured with different parameter values, and the UE may select the configuration in the list to use for a given PW. (Parameters for PW configurations are described in more detail hereafter.) In such instances, the UE 105 or LMF 220 may send a request to the serving gNB 210 to reconfigure the list of preconfigured PW configurations based on a given RS configuration (e.g., in a manner similar to requests shown by arrows 940 and 1040 of FIGS. 9 and 10). The list may be indexed to enable the UE to communicate the selection of the PW configuration using an index indication. Additionally or alternatively, according to some embodiments, the serving gNB 210 may activate, deactivate, and/or switch between PW can durations in a similar manner, indicating the selection to the UE 105 using DCI, MAC-CE, or RRC.

According to a second technique for configuring and signaling a PW to be used by a target UE for measuring at least one RS, rather than sending a request to the serving gNB 210 (e.g., by the UE 105 or LMF 220), a PW may be implicitly derived based on RS configuration. That is, the LMF 220 or UE 105 may send an RS configuration to the serving gNB 210, and the UE 105 and serving gNB 210 can each separately derive the PW configuration according to applicable rules (e.g., as defined in a governing specification). This can reduce latency to configure a PW for RS measurements (e.g., in a process similar to process 900 or process 1000) because the serving gNB 210 may omit providing the UE 105 with a PW configuration.

Depending on desired functionality, a PW configuration may include a combination of values for one or more different parameters. Starting time, for example, may comprise one such parameter, which may be indicated by a number of symbols, slots, subframes, or frames after reception of the PW request. Duration of the PW is another parameter, which also may be indicated by a number of symbols, slots, subframes, or frames. In cases where a PW comprises multiple PW occasions (e.g., similar to PRS occasions as described with respect to FIG. 5), a PW configuration may comprise an indication of periodicity, which also may be indicated by a number of symbols, slots, subframes, or frames. Additionally or alternatively, the PW configuration may include an indication of a BWP for the RS measurement(s) to be taken during the PW. According to some embodiments, the PW configuration may also include an indication of RS data, such as a priority of an RS in the PW.

The PW configuration may vary to accommodate the actions to be performed during the PW. Additional information regarding these actions and corresponding PW components are provided with respect to FIG. 11.

Figure 11:
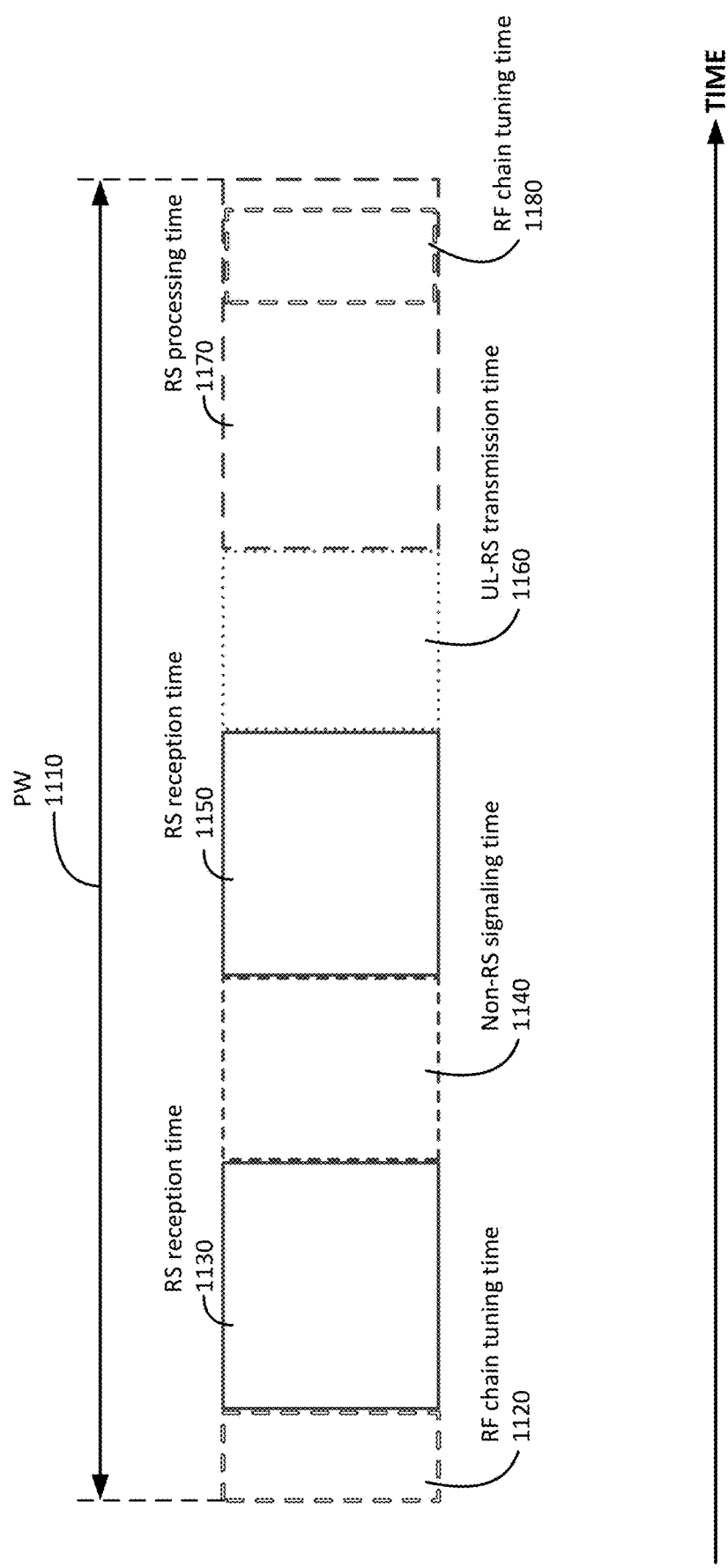
FIG. 11 is a diagram illustrating various components of a PW, according to an embodiment.

FIG. 11 is a diagram illustrating various components of a PW 1110, according to an embodiment. As illustrated, the PW 1110 may comprise an initial RF chain tuning time 1120, a first RS reception time 1130, non-RS signaling time 1140, a second RS reception time 1150, and optional UL-RS transmission time 1160 RS processing time 1170, and a final RF chain tuning time 1180. It can be noted, however, that the PW 1110 of FIG. 11 is provided as a non-limiting example. The presence and duration of different components may vary and may be accommodated by different PW configurations. In particular, the initial RF chain tuning time 1120 and final RF chain tuning time 1180 may not be present where RF chain tuning is not needed and may be based on a UE's capability. Furthermore, although two RS reception times are illustrated in FIG. 11 (first RS reception time 1130 and second RS reception time 1150), a PW may have fewer or more RS reception times, as needed. Put generally, a PW may comprise one or more times designated for RS reception. Each RS reception time and may be based on specific features of the RS (e.g., RS configuration, comb size, number of symbols, repetition, muting pattern, etc.). UL-RS transmission time 1160 may comprise a designated time for the UE to transmit a UL-RS (e.g., UL-PRS, SRS, etc.). According to some embodiments, the UL-RS transmission may be transmitted at any time during the PW 1110 although, as shown in FIG. 11, this time may be designated within a PW 1110. Because the UL-RS may not be needed in some instances, it therefore may be omitted in certain PW configurations.

To be clear, a PW may include different combinations of components as needed. RF chain tuning times (e.g., RF chain tuning times 1120 and 1180) are optional and may be included at the beginning and end of a PW if BWP switching is required for the PW, which may be based on the capability of the UE or PRS measurement requirement. As noted, one or more RS reception times (e.g., RS reception times 1130 and 1150) may be included if the UE is to measure one or more RS instances. (According to some embodiments, at least one RS reception time must be included if the PW does not include a UL-RS transmission.) Similar to the RS reception times, and RS processing time (e.g., RS processing time 1170) may be included if the UE is to measure one or more RS instances. A UL-RS transmission time (e.g., UL-RS transmission time 1160) optionally may be included, however, as noted, some embodiments may require a UL-RS transmission time if no RS reception times are included in the PW. Finally, non-RS signaling time (e.g., non-RS signaling time 1140) optionally may be included, depending on desired functionality.

The RS processing time 1170 may be based on UE's capability. In LPP, this capability may be reported by the UE to the LMF, for example, using parameters durationOfPRS-Processing and/or maxNumOfDL-PRS-ResProcessedPerSlot. It can be noted, however, that some of these parameters May assume the maximum PRS bandwidth, which may not reflect the real time bandwidth of an RS measurement during the PW. Instead, the real-time bandwidth may refer to the bandwidth of current active BWP or the overlap in bandwidth between the active BWP and the measured RS. The gNB, UE, and/or LMF may either use this parameter directly as the worst case bound or scale the processing time based on the ratio (real-time bandwidth/maximum RS bandwidth).

Figure 6:
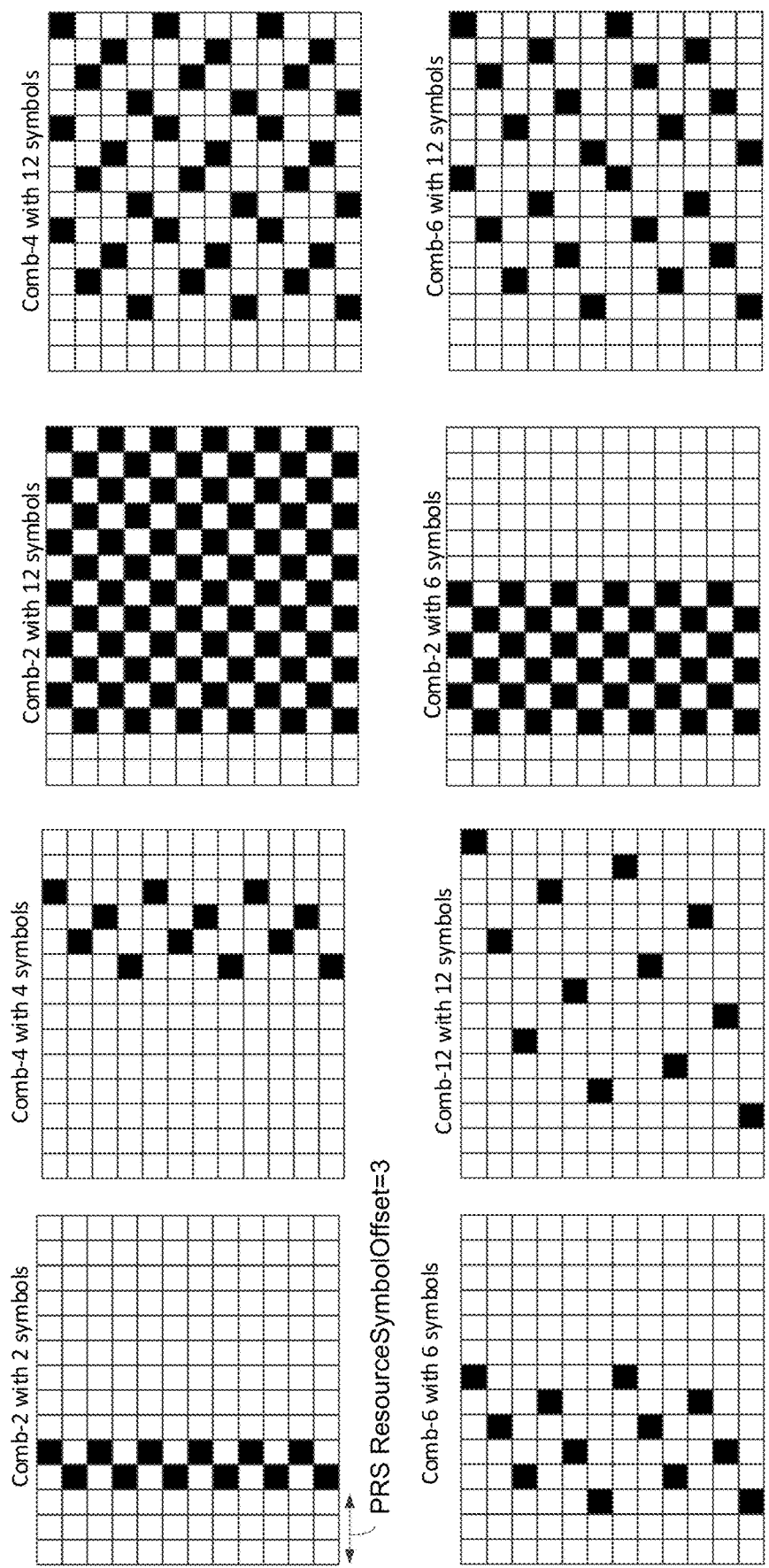
FIG. 6 is a diagram showing example combination (comb) structures, illustrating how RF signals may utilize different sets of resource elements, according to some embodiments.

Non-RS signaling time 1140 may comprise a time period within the PW 1110 during which UL and/or DL data that may be unrelated to an RS may be communicated. Although illustrated between a first RS reception time 1130 and a second RS reception time 1150, a non-RS signaling time 1140 may be located elsewhere within a PW 1110, such as between the second RS reception time 1150 and the UL-RS transmission time 1160, after the UL-RS transmission time 1160, and/or before the first RS reception time 1130, for example. This can help reduce the impact the PW 1110 has on non-RS communication. As with other features of the PW 1110, the location and duration of the non-RS signaling time 1140 may be determined in terms of symbols, slots, subframes, frames, or any combination thereof. At the symbol level, for example, non-RS signaling time may comprise unused symbols in a slot that also comprises symbols used by an RS instance. For example, (as shown in FIG. 6) where an RS instance comprises a comb-4 structure that occupies four symbols of a 14-symbol slot, the remaining 10 symbols of the slot may be designated as non-RS signaling time 1140.

Depending on desired functionality, the PW duration (e.g., as defined in a PW configuration) can be defined as N consecutive symbols, slots, subframes, frames, or any combination of these. In a first option, the duration of each PW instance may be defined at symbol level or a slot level. This can be done at a per-RS resources level, where each PW duration may span on the symbols of a slot of an RS resource and may further include RF tuning time and/or processing time, if needed. (With respect to FIG. 8, for example, one PW would be defined for each resource.) This method may create many PW fragments. Alternatively, this can to capture all RS resources in an RS resource set, where each PW duration may span consecutive symbols of consecutive slots for all RS resources of a single RS resource set and may further include RF tuning time and/or processing time, if needed. (With respect to FIG. 8, for example, a single PW would be defined for all resources.) In a second option, a PW may be defined with a PW duration and a merge condition, enabling the PW to be merged to another PW in certain circumstances.

The use of a PW to measure and process one or more RS resources may be dependent on conditions that enable RS resource measurement without switching from the active BWP. As previously mentioned, conditions may include the UE having the corresponding capability and an RS having the same numerology as the active BWP. Additionally, according to embodiments provided herein, BWP switching during a PW may be restricted to help ensure undesired changes in the BWP do not occur during the PW. The reason for this is described with regard to FIG. 12

Figure 12:
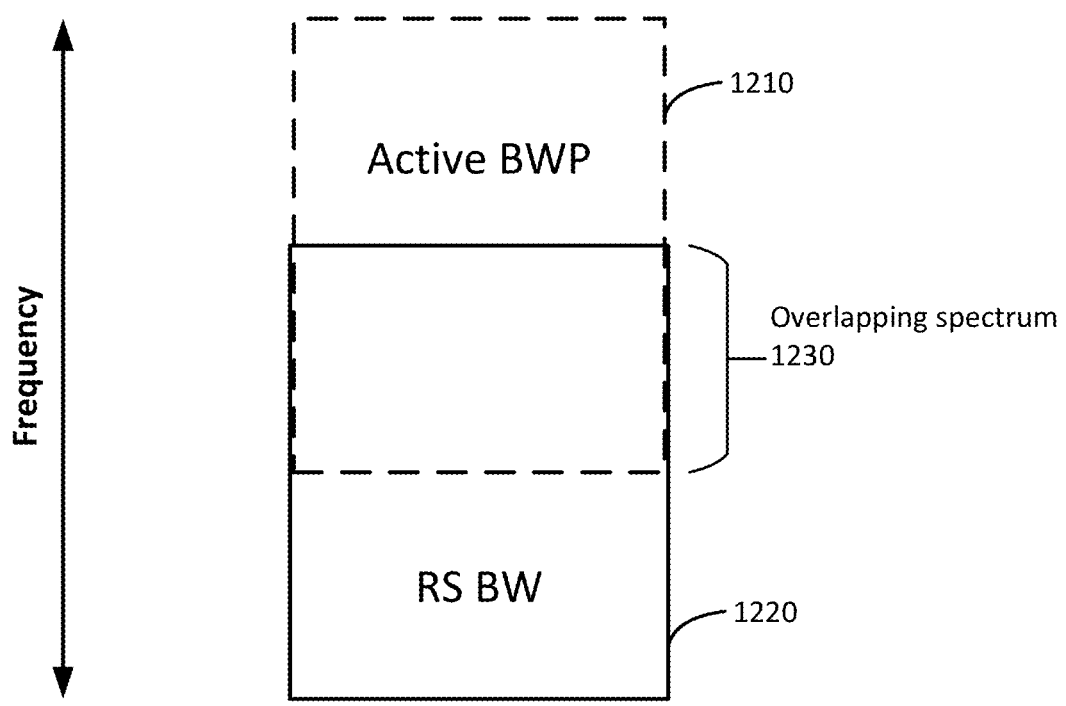
FIG. 12 is a diagram illustrating an example frequency overlap that enables a UE to take measurements of reference signal (RS) resources without tuning away from an active bandwidth part (BWP).

FIG. 12 is a diagram illustrating an example frequency overlap that enables a UE to take measurements of an RS within the active BWP. Specifically, the active BWP 1210 of the UE and the RS bandwidth (BW) 1220 have some overlapping spectrum 1230, which enables the UE to take RS measurements using at least the overlapping spectrum 1230. However, as noted, changes in the active BWP 1210 can be problematic to a PW because it can alter the overlapping spectrum 1230 and negatively impact measurement of the RS by the UE.

Thus, according to embodiments, BWP switching may be limited within a PW and/or across PW instances. (As previously described, a PW may comprise a set of multiple PW instances or occurrences, in a manner similar to the PRS described with regard to FIG. 5.) That is, BWP switching restrictions may restrict parameter changes allowed in the process of BWP switching. These BWP switching restrictions may be implemented by employing any combination of (i) ensuring the serving gNB will not reconfigure or switch the active BWP during the PW, (ii) ensuring the UE suspends a BWP inactivity timer of current active BWP (thereby preventing fall back to a default BWP if the inactivity timer lapses), (iii) ensuring the numerology and/or BW of the BWP do not change (or only allow overlapping bandwidth to increase or decrease, etc.), and/or (iv) preventing a change to the overlapping spectrum 1230 between the active BWP 1210 and RS BW 1220. (According to some embodiments, the overlapping spectrum 1230 may be defined at the beginning of the PW or the beginning of the first PW instance/occurrence.) The BWP switching restriction implemented by any or all of operations (i)-(iv) may be defined either in a governing specification (e.g., for data communications between the UE and serving gNB) or per a request by the UE or LMF to the serving gNB (e.g., as part of the PW request). The serving gNB may determine a PW configuration with a BWP switching restriction based on its capability and scheduling. The BWP switching restriction may be an information element included in the PW configuration.

Depending on desired functionality, the BWP switching restriction during a PW may be enforced in different ways (e.g., as indicated in a corresponding PW configuration). According to some embodiments, for example, a BWP switching restriction may be applied to within one PW instance. That is, a BWP switching restriction of a PW configuration may be applied on a per-PW instance basis. Additionally or alternatively, a BWP switching restriction may be applied across consecutive PW instances. In the latter case, the BWP switching restriction across consecutive instances may prevent the serving gNB from switching the active BWP during the interval between PW instances, which may result in different active BWPs for different PW instances, causing accuracy variation across consecutive samples of RS resources.

Different approaches may be taken when applying a BWP restriction across multiple PW instances. For example, according to an implicit approach, the serving gNB and the UE may each derive BWP switching restriction configuration based on an RS configuration. The UE can then switch to this BWP before each PW instance (in which case tuning time to switch to this BWP is not included in the PW instance) or at the beginning of each PW instance (in which case tuning time to switch to this BWP may be included in the PW instance). According to an explicit approach, the serving gNB may provide a PW configuration indicative of the BWP of the PW, which may be responsive to the UE or LMF requesting a PW configuration with a specific BWP. Again, tuning may take place before or at the beginning of each PW instance, depending on desired functionality. In either implicit or explicit approaches, the BWP may be selected from a list of preconfigured BWPs, which should have the same numerology as the RS. Further, the selected BWP may have the maximum overlap with the RS from among the preconfigured BWPs. Additionally or alternatively, the BWP for the PW may be generated based on PRS, PFL, and BW parameters, as well as gNB capability and UE capability. The generated BWP may cover all the RS BW (e.g., RS BW 1220). According to some embodiments, the detailed PDSCH, PDCCH, and/or PUSCH configuration may be inherited from other preconfigured BWPs. According to some embodiments, this design may be applied to a limited number of consecutive PW instances. For example, all PW instances of a measurement period (e.g., as defined under 3GPP specification TS 38.133).

During the interval between PW instances, BWP operation may be implemented in different ways. According to a first option, for example, the UE and serving gNB may not switch from a BWP of the PW to another BWP during a measurement period. According to a second option, the serving gNB may switch the active BWP by sending DCI (or the UE may switch the active BWP due to expired inactivity timer). However, the UE may expect a DCI before a PW instance to switch to the BWP of the PW. If the UE does not receive the BWP-switching DCI to switch to the PW BWP, the UE may then switch to the BWP of the PW before entering PW or at the beginning of PW (e.g., in the manner previously discussed). According to a third option, BWP switching may be allowed, but the UE may switch to the BWP of the PW before entering PW or at the beginning of PW. This switching can be in accordance with a governing specification or a received configuration.

It can be noted that, according to some embodiments, the UE may measure an RS resource within an active BWP based on whether the measurement meets an accuracy requirement. An accuracy of an RS measurement, especially timing measurements, is proportional to the BW. Thus, if a UE can only measure RS within in active BWP, it may not meet the accuracy requirement of the measurement. With this in mind, embodiments may employ one of several different options for a PW.

According to a first option, the UE may always measure the portion of the RS in the overlapping spectrum 1230. When providing measurement results in the corresponding measurement report, the UE may further indicate accuracy-related information. For example, the UE may indicate the measured bandwidth, accuracy/uncertainty of a measurement. Additionally or alternatively, the UE may use a bit indicator to indicate whether a measurement can meet the accuracy or not.

According to a second option, the UE may only measure the portion of the RS in the overlapping spectrum 1230 when (i) the BW of the overlapping spectrum 1230 is larger or equal to an absolute value of BW (e.g., a minimum BW threshold), or the overlapping spectrum 1230 is larger or equal to a ratio (e.g., a ratio, or relative portion, of the overlapping spectrum 1230 to the RS BW 1220 or active BWP 1210). Depending on desired functionality, this absolute value or ratio may be provided to the UE (e.g., by the LMF or location service (LCS) client), or it may be derived by the UE based on an accuracy requirement or quality of service (QOS).

According to a third option, the UE may optionally measure a portion of the RS BW 1220 outside the active BWP 1210 (e.g., at least a portion of the RS BW 1220 outside the overlapping spectrum 1230). In the measurement report, UE may further indicate the extra RS BW 1220 it measured beyond the active BWP 1210. As an example, this may occur during the aggregation of two CCs with two active BWPs. The two CCs may have a gap on the spectrum. The UE may use one front end to receive both BWPs, and the RS may overlap with the gap, thus measurements may have a larger BW.

According to some embodiments, if an RS resource is not measured due to the BW considerations above, the UE may choose not to report the measurement or report the measurement with a value indicating the measurement is missing.

Depending on desired functionality, one or more exception rules can be made when implementing he previously described options. For example, one such exception rule may apply where a relationship exists across a set of RS resources. That is, some measurements (e.g., RSTD, RSRPs of DL-AoDs) may be based on a set of RS resources rather than a single RS resource. For example, RSTD is the difference in ToA of RS resources received from of two TRPs. Additionally, DL-AoDs require a UE to measure a number (N) of DL-PRS resources from one TRP. Measuring a subset of PRS resources may therefore yield inferior or incomplete measurements. Embodiments may solve this problem by enabling the UE to temporarily ignore the overlap BW consideration (e.g., whether the overlapping spectrum 1230 comprises a threshold BW or minimum ratio) and measure all necessary RS resources for one measurement within the active BWP 1210, if at least a subset of RS resources can meet the accuracy requirement. This exception rule may be defined by the LMF, a governing specification, or determined by the UE itself.

Another such exception rule may apply where there is a relationship between consecutive samples of the same RS resources. For example, a governing specification or LMF may require the UE to report a measurement with either M samples or 4 samples. However, due to BWP switching, the overlapping spectrum 1230 of RS resources may vary across consecutive RS instances. With this in mind, embodiments may employ one of two options. According to a first option, the UE may follow and accuracy requirement, only measuring certain RS resources of certain RS instances. Missing samples may be treated as muted RS resources. This option relaxes the M-sample requirement, where the UE may measure 0<k<M samples, but is still allowed to report this measurement. According to some embodiments, the UE may further indicate the missing sample information to the LMF by, for example, indicating its sample selection and/or sample combination strategy to the LMF.

According to a second option, the UE may measure subsequent RS instances based on the measured RS in the previous instance. For example, a measured RS in a first instance may determine the measurement behaviour of the UE four the following RS instances in a measurement. Thus, if a UE measures and RS in a first instance because the RS meets a BW requirement, the UE may also measure subsequent RS instances in the same manner (whether or not they meet the BW requirement). Because "low quality" samples due to BW limitation (e.g., a BW having less than a threshold value) may contribute to a final measurement, the UE may either indicate the measurement is based one or more "low quality" samples to LMF or only use "high quality" samples when reporting to the LMF. (The use of only high-quality samples may result in reporting fewer than required M-sample requirement, similar to the first option described above.)

Figure 13A:
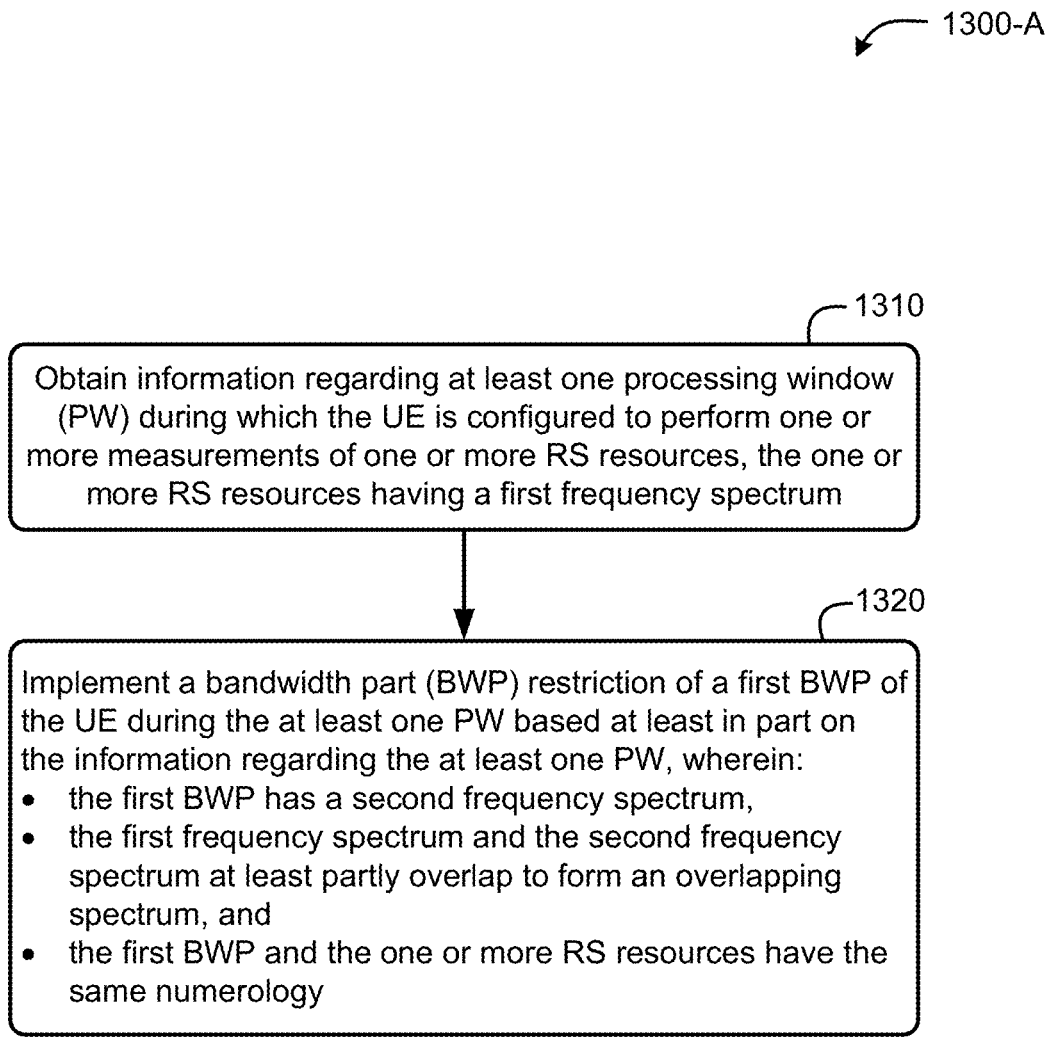
FIG. 13A is a flow diagram of a method of coordinating RS processing at a UE, according to an embodiment.

FIG. 13A is a flow diagram of a method 1300-A of coordinating RS processing at a UE, according to an embodiment. Means for performing the functionality illustrated in one or more of the blocks shown in FIG. 13A may be performed by hardware and/or software components of a UE (e.g., a target UE) or base station (e.g., serving base station). Example components of a UE are illustrated in FIG. 14, and example components of a base station are illustrated in FIG. 15, both of which are described in more detail below.

At block 1310, the functionality comprises obtaining information regarding at least one PW during which the UE is configured to perform one or more measurements of one or more RS resources, the one or more RS resources having a first frequency spectrum. As noted in the previously-described embodiments, obtaining information regarding the at least one PW may be done in different ways, depending on desired functionality. According to some embodiments, the information regarding the at least one PW may be included, for example, in a PW configuration, which may be provided to a UE by a serving base station (e.g., in response to a PW configuration request sent to the serving base station by the UE or location server). The information regarding the at least one PW may be determined based on information regarding the one or more RS resources. This may be provided to a UE via an RS configuration (e.g., PRS configuration) and/or provided to the serving base station as part of the PW configuration request.

Figure 14:
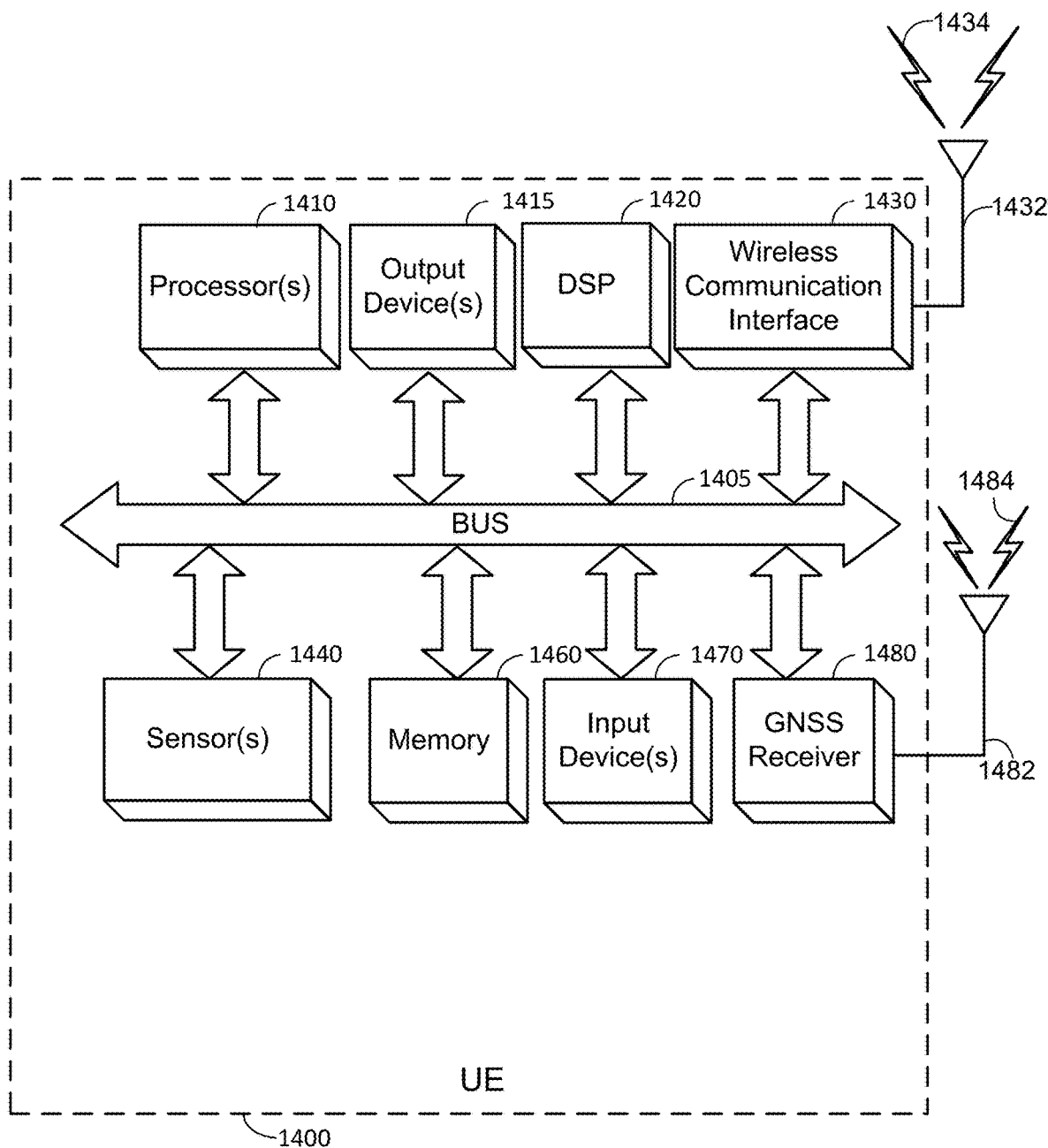
FIG. 14 is a block diagram of an embodiment of a UE, which can be utilized in embodiments as described herein.
Figure 15:
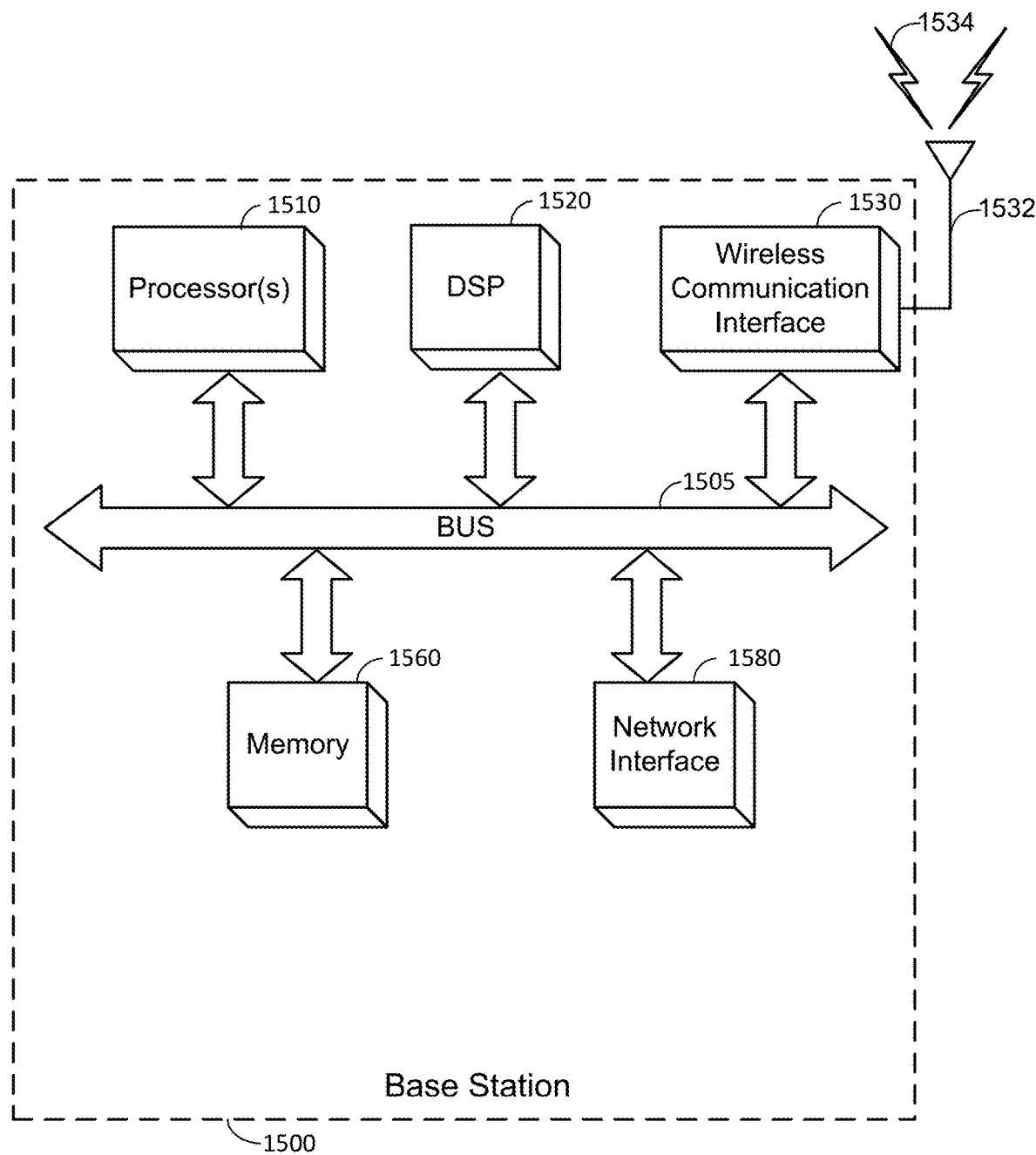
FIG. 15 is a block diagram of an embodiment of a base station, which can be utilized in embodiments as described herein.

Means for performing functionality at block 1310 may comprise bus 1405, processor(s) 1410, memory 1460, wireless communication interface 1430, and/or other components of a UE 1400 as illustrated in FIG. 14; or bus 1505, processor(s) 1510, memory 1560, wireless communication interface 1530, and/or other components of a base station 1500 as illustrated in FIG. 15.

At block 1320, the functionality comprises implementing a BWP restriction of a first BWP of the UE during the at least one PW based at least in part on the information regarding the at least one PW, wherein the first BWP has a second frequency spectrum, the first frequency spectrum and the second frequency spectrum at least partly overlap to form an overlapping spectrum, and the first BWP and the one or more RS resources have the same numerology. As indicated in the previously-described embodiments, implementing a BWP restriction may be done in different ways, depending on desired functionality. According to some embodiments, implementing the BWP restriction may comprise implementing the BWP restriction in accordance with a BWP configuration. As noted, a BWP configuration may be included in a PW configuration and/or based on an RS configuration. In some embodiments, the BWP configuration may be one of many predetermined BWP configurations from which the UE or serving base station may select the BWP configuration. As such, according to some embodiments, the method 1300-A may further comprise selecting the BWP configuration from a plurality of predetermined BWP configurations based at least in part on information regarding the one or more RS resources.

Means for performing functionality at block 1320 may comprise bus 1405, processor(s) 1410, memory 1460, wireless communication interface 1430, and/or other components of a UE 1400 as illustrated in FIG. 14; or bus 1505, processor(s) 1510, memory 1560, wireless communication interface 1530, and/or other components of a base station 1500 as illustrated in FIG. 15.

As previously indicated, the method 1300-A may be performed by a serving base station of the UE, or by the UE. In embodiments in which the method is performed by the UE, implementing the BWP restriction may comprise suspending a BWP inactivity timer of the first BWP during the at least one PW. Additionally or alternatively, the the information regarding the at least one PW may be included in a PW configuration, and obtaining the information regarding the at least one PW may comprise sending a PW configuration request from the UE to a serving base station of the UE, and receiving the PW configuration at the UE from the serving base station. In such embodiments, the method 1300-A may further comprise sending a request for the BWP restriction with the PW configuration request. As noted, the PW configuration may comprise information regarding the BWP restriction. Additionally or alternatively, implementing the BWP restriction may comprise determining the BWP restriction based at least in part on the information regarding the at least one PW. As noted, this may be performed at the UE without further configuration by the serving base station.

Alternative functionality may be implemented in embodiments where the method 1300-A is performed by a serving base station of the UE. In such embodiments, for example, implementing the BWP restriction may comprise preventing reconfiguration or switching of the first BWP, preventing a change in either or both of a numerology or bandwidth (BW) of the first BWP, or preventing a change in the overlapping spectrum, or a combination thereof. In such cases, obtaining the information regarding the at least one PW may comprise receiving, at the serving base station, a PW configuration request from the UE or a location server, and responsive to receiving the PW configuration request, determining a PW configuration. In such embodiments, the method 1300-A may further comprise sending the PW configuration from the serving base station to the UE. This optionally may comprise including information regarding the BWP restriction in the PW configuration.

Additional or alternative operations may be performed, depending on desired functionality. According to some embodiments, for example, the at least one PW may comprise a plurality of consecutive PW instances, and implementing the BWP restriction during the at least one PW may comprise implementing the BWP restriction during each PW instance of the plurality of consecutive PW instances. In such instances, the UE may switch to a second BWP after a first PW instance of the plurality of consecutive PW instances, and implementing the BWP restriction may further comprise the UE switching from the second BWP back to the first BWP before or at a beginning of a second PW instance of the plurality of consecutive PW instances.

Figure 13B:
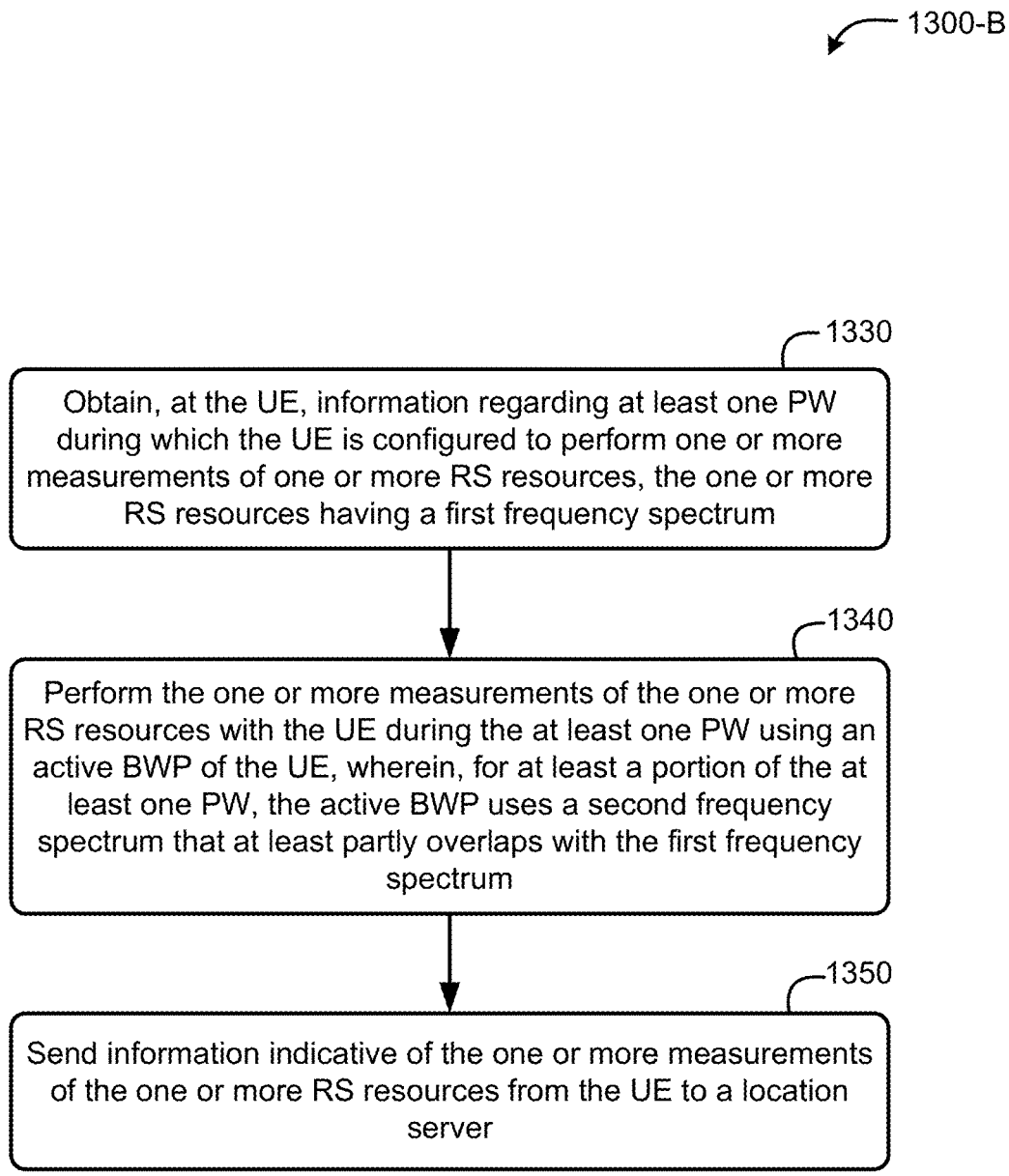
FIG. 13B is a flow diagram of a method of coordinating RS processing by a UE, according to an embodiment.

FIG. 13B is a flow diagram of a method 1300-B of coordinating RS processing at a UE, according to an embodiment. Means for performing the functionality illustrated in one or more of the blocks shown in FIG. 13B may be performed by hardware and/or software components of a UE (e.g., a target UE). Again, example components of a UE are illustrated in FIG. 14, and example components of a base station are illustrated in FIG. 15, both of which are described in more detail below.

At block 1330, the functionality comprises obtaining, at the UE, information regarding at least one PW during which the UE is configured to perform one or more measurements of one or more RS resources, the one or more RS resources having a first frequency spectrum. Again, obtaining information regarding the at least one PW may be done in different ways, depending on desired functionality. According to some embodiments, the information regarding the at least one PW may be included, for example, in a PW configuration, which may be provided to a UE by a serving base station (e.g., in response to a PW configuration request sent to the serving base station by the UE or location server). The information regarding the at least one PW may be determined based on information regarding the one or more RS resources. This may be provided to a UE via an RS configuration (e.g., PRS configuration) and/or provided to the serving base station as part of the PW configuration request.

Means for performing functionality at block 1330 may comprise bus 1405, processor(s) 1410, memory 1460, wireless communication interface 1430, and/or other components of a UE 1400 as illustrated in FIG. 14.

At block 1340, the functionality comprises performing the one or more measurements of the one or more RS resources with the UE during the at least one PW using an active BWP of the UE, wherein, for at least a portion of the PW, the active BWP uses a second frequency spectrum that at least partly overlaps with the first frequency spectrum. Here, however, BWP restrictions may not necessarily be implemented at the active BWP, and thus BWP switching may occur. However, as previously noted, embodiments may accommodate such switching (which may impact overlapping spectrum) in different ways. According to some embodiments, for example, performing the one or more measurements of the one or more RS resources may be responsive to a determination that a BW of an overlapping spectrum between the one or more RS resources and the active BWP satisfies a threshold value. In such embodiments, the threshold value may comprise a minimum absolute value of BW, a ratio of the BW of the overlapping spectrum to the first frequency spectrum, or a ratio of the BW of the overlapping spectrum to the second frequency spectrum. According to some embodiments, performing the one or more measurements of the one or more RS resources during the at least one PW comprises measuring at all RS resources an RS resource set during a plurality of consecutive PW instances, responsive to a determination that an overlapping spectrum between at least one RS resource of the subset and the active BWP during one or more of the PW instances of the plurality of consecutive PW instances, meets an accuracy requirement. This can allow the functionality previously described, where the UE takes measurements for an entire RS resource set based on at least one RS resource exceeding a threshold. When reporting measurements, the UE may identify those that may not meet an accuracy requirement. Additionally or alternatively, performing the one or more measurements of the one or more RS resources during the at least one PW may comprise measuring a subset of RS resources of an RS resource set during a plurality of consecutive PW instances, responsive to a determination that an overlapping spectrum between each RS resource of the subset and the active BWP during a subset of the PW instances of the plurality of consecutive PW instances meets an accuracy requirement. As previously described, this may enable the UE to measure only those RS resources that meet the accuracy requirement. According to some embodiments, performing the one or more measurements of the one or more RS resources during the at least one PW comprises (i) measuring an initial subset of RS resources of an RS resource set during an initial PW instance of a plurality of consecutive PW instances, responsive to a determination that an overlapping spectrum of the active BWP during the initial PW instance meets an accuracy requirement, and (ii) measuring one or more subsequent the same subset of RS resources of the RS resource set during one or more subsequent PW instances of the plurality of consecutive PW instances.

Means for performing functionality at block 1340 may comprise bus 1405, processor(s) 1410, memory 1460, wireless communication interface 1430, and/or other components of a UE 1400 as illustrated in FIG. 14.

At block 1350, the functionality comprises sending information indicative of the one or more measurements of the one or more RS resources from the UE to a location server. This may be provided in a measurement report or similar message that may comprise the measurements themselves. This measurement report or message may be sent to the location server in accordance with a governing standard. According to some embodiments, the information indicative of the one or more measurements of the one or more RS resources may include information indicative of the frequency spectrum of the active BWP during the one or more measurements, the BW of the active BWP during the one or more measurements, a ratio of a BW of an overlapping spectrum between the one or more RS resources and the active BWP to the first frequency spectrum, a ratio of a BW of an overlapping spectrum between the one or more RS resources and the active BWP to the second frequency spectrum, or whether the one or more measurements met an accuracy requirement, or any combination thereof. As noted, some embodiments may allow for taking measurements outside the overlapping spectrum (e.g., increasing BW for such measurements) in which case such measurements may be included in the information provided to the location server. As such, according to some embodiments, performing one or more second measurements of the one or more RS resources using a portion of the first frequency spectrum not included in an overlapping spectrum between the one or more RS resources and the active BWP, and sending information indicative of the use of the portion of the first frequency spectrum not included in the overlapping spectrum.

Means for performing functionality at block 1350 may comprise bus 1405, processor(s) 1410, memory 1460, wireless communication interface 1430, and/or other components of a UE 1400 as illustrated in FIG. 14.

FIG. 14 is a block diagram of an embodiment of a UE 1400, which can be utilized as described herein above (e.g., in association with FIGS. 1-19), and may therefore correspond with the UE of other figures (e.g., UE 105). For example, the UE 1400 can perform one or more of the functions of the method shown in FIG. 13. It should be noted that FIG. 14 is meant only to provide a generalized illustration of various components, any or all of which may be utilized as appropriate. It can be noted that, in some instances, components illustrated by FIG. 14 can be localized to a single physical device and/or distributed among various networked devices, which may be disposed at different physical locations. Furthermore, as previously noted, the functionality of the UE discussed in the previously described embodiments may be executed by one or more of the hardware and/or software components illustrated in FIG. 14.

The UE 1400 is shown comprising hardware elements that can be electrically coupled via a bus 1405 (or may otherwise be in communication, as appropriate). The hardware elements may include a processor(s) 1410 which can include without limitation one or more general-purpose processors (e.g., an application processor), one or more special-purpose processors (such as digital signal processor (DSP) chips, graphics acceleration processors, application specific integrated circuits (ASICs), and/or the like), and/or other processing structures or means. Processor(s) 1410 may comprise one or more processing units, which may be housed in a single integrated circuit (IC) or multiple ICs. As shown in FIG. 14, some embodiments may have a separate DSP 1420, depending on desired functionality. Location determination and/or other determinations based on wireless communication may be provided in the processor(s) 1410 and/or wireless communication interface 1430 (discussed below). The UE 1400 also can include one or more input devices 1470, which can include without limitation one or more keyboards, touch screens, touch pads, microphones, buttons, dials, switches, and/or the like; and one or more output devices 1415, which can include without limitation one or more displays (e.g., touch screens), light emitting diodes (LEDs), speakers, and/or the like.

The UE 1400 may also include a wireless communication interface 1430, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the UE 1400 to communicate with other devices as described in the embodiments above. The wireless communication interface 1430 may permit data and signaling to be communicated (e.g., transmitted and received) with TRPs of a network, for example, via eNBs, gNBs, ng-eNBs, access points, various base stations and/or other access node types, and/or other network components, computer systems, and/or any other electronic devices communicatively coupled with TRPs or base stations, as described herein. The communication can be carried out via one or more wireless communication antenna(s) 1432 that send and/or receive wireless signals 1434. According to some embodiments, the wireless communication antenna(s) 1432 may comprise a plurality of discrete antennas, antenna arrays, or any combination thereof. The antenna(s) 1432 may be capable of transmitting and receiving wireless signals using beams (e.g., Tx beams and Rx beams). Beam formation may be performed using digital and/or analog beam formation techniques, with respective digital and/or analog circuitry. The wireless communication interface 1430 may include such circuitry.

Depending on desired functionality, the wireless communication interface 1430 may comprise a separate receiver and transmitter, or any combination of transceivers, transmitters, and/or receivers to communicate with base stations (e.g., ng-eNBs and gNBs) and other terrestrial transceivers, such as wireless devices and access points. The UE 1400 may communicate with different data networks that may comprise various network types. For example, a Wireless Wide Area Network (WWAN) may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000®, WCDMA, and so on. CDMA2000® includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. CDMA2000® is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The UE 1400 can further include sensor(s) 1440. Sensor(s) 1440 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information.

Embodiments of the UE 1400 may also include a Global Navigation Satellite System (GNSS) receiver 1480 capable of receiving signals 1484 from one or more GNSS satellites using an antenna 1482 (which could be the same as antenna 1432). Positioning based on GNSS signal measurement can be utilized to complement and/or incorporate the techniques described herein. The GNSS receiver 1480 can extract a position of the UE 1400, using conventional techniques, from GNSS satellites 110 of a GNSS system, such as Global Positioning System (GPS), Galileo, GLONASS, Quasi-Zenith Satellite System (QZSS) over Japan, IRNSS over India, BeiDou Navigation Satellite System (BDS) over China, and/or the like. Moreover, the GNSS receiver 1480 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 1480 is illustrated in FIG. 14 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processors, such as processor(s) 1410, DSP 1420, and/or a processor within the wireless communication interface 1430 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), a hatch filter, particle filter, or the like. The positioning engine may also be executed by one or more processors, such as processor(s) 1410 or DSP 1420.

The UE 1400 may further include and/or be in communication with a memory 1460. The memory 1460 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1460 of the UE 1400 also can comprise software elements (not shown in FIG. 14), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1460 that are executable by the UE 1400 (and/or processor(s) 1410 or DSP 1420 within UE 1400). In some embodiments, then, such code and/or instructions can be used to configure and/or adapt a general-purpose computer (or other device) to perform one or more operations in accordance with the described methods.

FIG. 15 is a block diagram of an embodiment of a base station 1500, which can be utilized as described herein above (e.g., in association with FIGS. 1-13) and may therefore correspond with a base station or TRP as described with respect to these other figures (e.g., base station 120, TRP 320, etc.). It should be noted that FIG. 15 is meant only to provide a generalized illustration of various components, any or all of which may be utilized as appropriate. In some embodiments, the base station 1500 may correspond to a gNB, an ng-eNB, and/or (more generally) a TRP.

The base station 1500 is shown comprising hardware elements that can be electrically coupled via a bus 1505 (or may otherwise be in communication, as appropriate). The hardware elements may include a processor(s) 1510 which can include without limitation one or more general-purpose processors, one or more special-purpose processors (such as DSP chips, graphics acceleration processors, ASICs, and/or the like), and/or other processing structure or means. As shown in FIG. 15, some embodiments may have a separate DSP 1520, depending on desired functionality. Location determination and/or other determinations based on wireless communication may be provided in the processor(s) 1510 and/or wireless communication interface 1530 (discussed below), according to some embodiments. The base station 1500 also can include one or more input devices, which can include without limitation a keyboard, display, mouse, microphone, button(s), dial(s), switch(es), and/or the like; and one or more output devices, which can include without limitation a display, light emitting diode (LED), speakers, and/or the like.

The base station 1500 might also include a wireless communication interface 1530, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, cellular communication facilities, etc.), and/or the like, which may enable the base station 1500 to communicate as described herein. The wireless communication interface 1530 may permit data and signaling to be communicated (e.g., transmitted and received) to UEs, other base stations/TRPs (e.g., eNBs, gNBs, and ng-eNBs), and/or other network components, computer systems, and/or any other electronic devices described herein. The communication can be carried out via one or more wireless communication antenna(s) 1532 that send and/or receive wireless signals 1534.

The base station 1500 may also include a network interface 1580, which can include support of wireline communication technologies. The network interface 1580 may include a modem, network card, chipset, and/or the like. The network interface 1580 may include one or more input and/or output communication interfaces to permit data to be exchanged with a network, communication network servers, computer systems, and/or any other electronic devices described herein.

In many embodiments, the base station 1500 may further comprise a memory 1560. The memory 1560 can include, without limitation, local and/or network accessible storage, a disk drive, a drive array, an optical storage device, a solid-state storage device, such as a RAM, and/or a ROM, which can be programmable, flash-updateable, and/or the like. Such storage devices may be configured to implement any appropriate data stores, including without limitation, various file systems, database structures, and/or the like.

The memory 1560 of the base station 1500 also may comprise software elements (not shown in FIG. 15), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1560 that are executable by the base station 1500 (and/or processor(s) 1510 or DSP 1520 within base station 1500). In some embodiments, then, such code and/or instructions can be used to configure and/or adapt a general-purpose computer (or other device) to perform one or more operations in accordance with the described methods.

Figure 16:
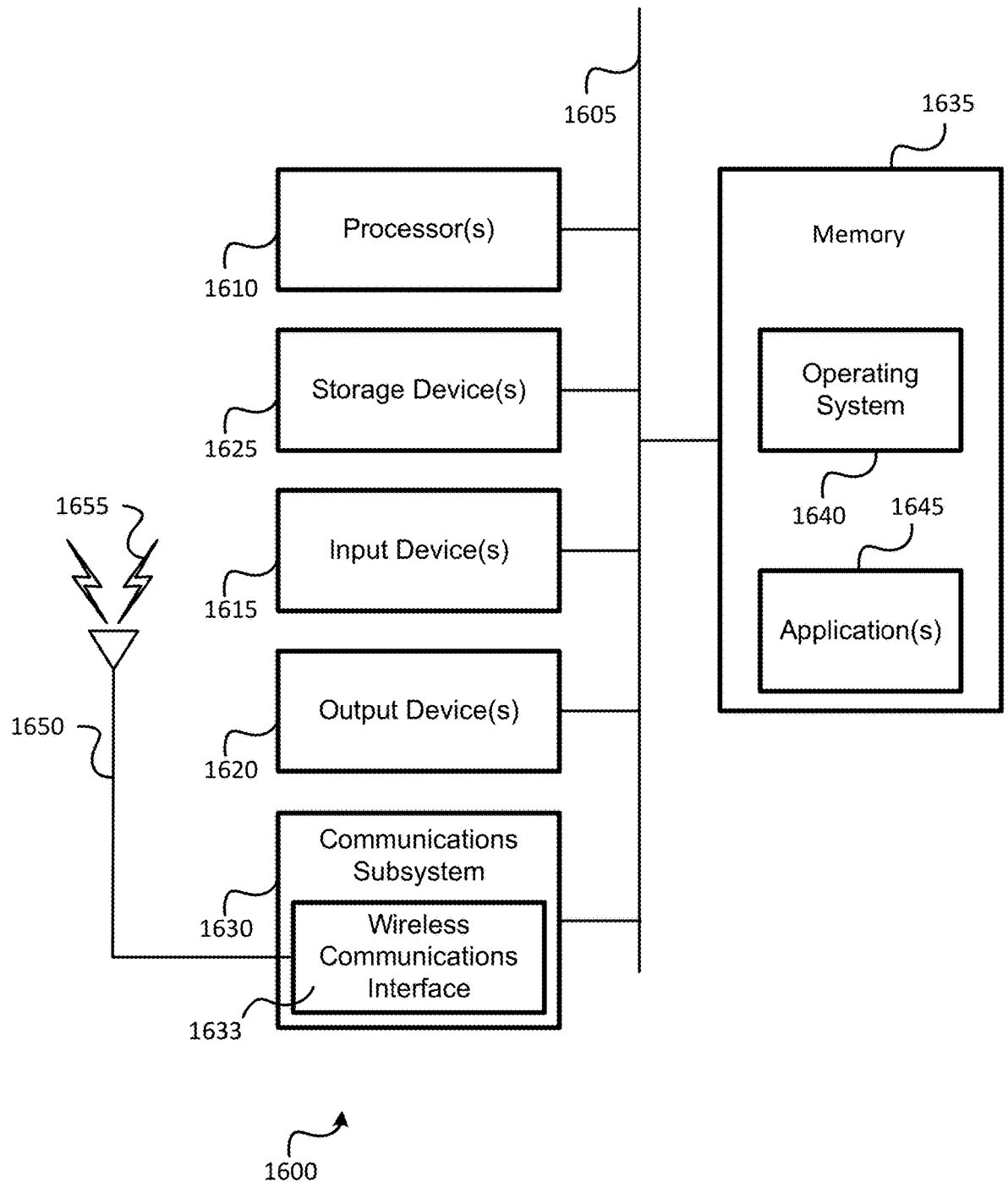
FIG. 16 is a block diagram of an embodiment of a computer system, which can be utilized in embodiments as described herein.

FIG. 16 is a block diagram of an embodiment of a computer system 1600, which may be used, in whole or in part, to provide the functions of one or more network components as described in the embodiments herein (e.g., location server 160 of FIG. 1, LMF of FIGS. 9 and 10, etc.). It should be noted that FIG. 16 is meant only to provide a generalized illustration of various components, any or all of which may be utilized as appropriate. FIG. 16, therefore, broadly illustrates how individual system elements may be implemented in a relatively separated or relatively more integrated manner. In addition, it can be noted that components illustrated by FIG. 16 can be localized to a single device and/or distributed among various networked devices, which may be disposed at different geographical locations.

The computer system 1600 is shown comprising hardware elements that can be electrically coupled via a bus 1605 (or may otherwise be in communication, as appropriate). The hardware elements may include processor(s) 1610, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 1600 also may comprise one or more input devices 1615, which may comprise without limitation a mouse, a keyboard, a camera, a microphone, and/or the like; and one or more output devices 1620, which may comprise without limitation a display device, a printer, and/or the like.

The computer system 1600 may further include (and/or be in communication with) one or more non-transitory storage devices 1625, which can comprise, without limitation, local and/or network accessible storage, and/or may comprise, without limitation, a disk drive, a drive array, an optical storage device, a solid-state storage device, such as a RAM and/or ROM, which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices via hubs, as described herein.

The computer system 1600 may also include a communications subsystem 1630, which may comprise wireless communication technologies managed and controlled by a wireless communication interface 1633, as well as wired technologies (such as Ethernet, coaxial communications, universal serial bus (USB), and the like). The wireless communication interface 1633 may comprise one or more wireless transceivers may send and receive wireless signals 1655 (e.g., signals according to 5G NR or LTE) via wireless antenna(s) 1650. Thus the communications subsystem 1630 may comprise a modem, a network card (wireless or wired), an infrared communication device, a wireless communication device, and/or a chipset, and/or the like, which may enable the computer system 1600 to communicate on any or all of the communication networks described herein to any device on the respective network, including a User Equipment (UE), base stations and/or other TRPs, and/or any other electronic devices described herein. Hence, the communications subsystem 1630 may be used to receive and send data as described in the embodiments herein.

In many embodiments, the computer system 1600 will further comprise a working memory 1635, which may comprise a RAM or ROM device, as described above. Software elements, shown as being located within the working memory 1635, may comprise an operating system 1640, device drivers, executable libraries, and/or other code, such as one or more applications 1645, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1625 described above. In some cases, the storage medium might be incorporated within a computer system, such as computer system 1600. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 1600 and/or might take the form of source and/or installable code, which, upon compilation and/or installation on the computer system 1600 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method of coordinating reference signal (RS) processing by a user equipment (UE), the method comprising: obtaining information regarding at least one processing window (PW) during which the UE is configured to perform one or more measurements of one or more RS resources, the one or more RS resources having a first frequency spectrum; and implementing a bandwidth part (BWP) restriction of a first BWP of the UE during the at least one PW based at least in part on the information regarding the at least one PW, wherein: the first BWP has a second frequency spectrum, the first frequency spectrum and the second frequency spectrum at least partly overlap to form an overlapping spectrum, and the first BWP and the one or more RS resources have the same numerology.

Clause 2. The method of clause 1, wherein the method is performed by the UE.

Clause 3. The method of any of clauses 1-2 wherein implementing the BWP restriction comprises suspending a BWP inactivity timer of the first BWP during the at least one PW.

Clause 4. The method of any of clauses 1-3 wherein the information regarding the at least one PW is included in a PW configuration, and wherein obtaining the information regarding the at least one PW comprises: sending a PW configuration request from the UE to a serving base station of the UE; and receiving the PW configuration at the UE from the serving base station.

Clause 5. The method of clause 4 further comprising including a request for the BWP restriction with the PW configuration request.

Clause 6. The method of any of clauses 4-5 wherein the PW configuration comprises information regarding the BWP restriction.

Clause 7. The method of any of clauses 1-6 wherein implementing the BWP restriction comprises determining the BWP restriction based at least in part on the information regarding the at least one PW.

Clause 8. The method of clause 1 wherein the method is performed by a serving base station of the UE.

Clause 9. The method of any of clauses 1 or 8 wherein implementing the BWP restriction comprises: preventing reconfiguration or switching of the first BWP, preventing a change in either or both of a numerology or bandwidth (BW) of the first BWP, or preventing a change in the overlapping spectrum, or a combination thereof.

Clause 10. The method of any of clauses 1 or 8-9 wherein obtaining the information regarding the at least one PW comprises: receiving, at the serving base station, a PW configuration request from the UE or a location server; and responsive to receiving the PW configuration request, determining a PW configuration.

Clause 11. The method of clause 10 further comprising sending the PW configuration from the serving base station to the UE.

Clause 12. The method of clause 11 further comprising including information regarding the BWP restriction in the PW configuration.

Clause 13. The method of any of clauses 1-12 wherein the at least one PW comprises a plurality of consecutive PW instances, and wherein implementing the BWP restriction during the at least one PW comprises implementing the BWP restriction during each PW instance of the plurality of consecutive PW instances.

Clause 14. The method of any of clauses 1-13 wherein the UE switches to a second BWP after a first PW instance of the plurality of consecutive PW instances, and wherein implementing the BWP restriction further comprises the UE switching from the second BWP back to the first BWP before or at a beginning of a second PW instance of the plurality of consecutive PW instances.

Clause 15. The method of any of clauses 1-14 wherein implementing the BWP restriction comprises implementing the BWP restriction in accordance with a BWP configuration.

Clause 16. The method of clause 15 further comprising selecting the BWP configuration from a plurality of predetermined BWP configurations based at least in part on information regarding the one or more RS resources.

Clause 17. A method of coordinating reference signal (RS) processing by a user equipment (UE), the method comprising: obtaining, at the UE, information regarding at least one processing window (PW) during which the UE is configured to perform one or more measurements of one or more RS resources, the one or more RS resources having a first frequency spectrum; performing the one or more measurements of the one or more RS resources with the UE during the at least one PW using an active BWP of the UE, wherein, for at least a portion of the at least one PW, the active BWP uses a second frequency spectrum that at least partly overlaps with the first frequency spectrum; and sending information indicative of the one or more measurements of the one or more RS resources from the UE to a location server.

Clause 18. The method of clause 17, wherein performing the one or more measurements of the one or more RS resources is responsive to a determination that a BW of an overlapping spectrum between the one or more RS resources and the active BWP satisfies a threshold value.

Clause 19. The method of clause 18 wherein the threshold value comprises a minimum absolute value of BW, a ratio of the BW of the overlapping spectrum to the first frequency spectrum, or a ratio of the BW of the overlapping spectrum to the second frequency spectrum.

Clause 20. The method of any of clauses 17-19 further comprising performing one or more second measurements of the one or more RS resources using a portion of the first frequency spectrum not included in an overlapping spectrum between the one or more RS resources and the active BWP; and sending information indicative of the use of the portion of the first frequency spectrum not included in the overlapping spectrum.

Clause 21. The method of any of clauses 17-19 wherein performing the one or more measurements of the one or more RS resources during the at least one PW comprises measuring all RS resources of an RS resource set during a plurality of consecutive PW instances, responsive to a determination that an overlapping spectrum between at least one RS resource of the RS resource set and the active BWP during one or more of the PW instances of the plurality of consecutive PW instances, meets an accuracy requirement.

Clause 22. The method of any of clauses 17-19 wherein performing the one or more measurements of the one or more RS resources during the at least one PW comprises measuring a subset of RS resources of an RS resource set during a plurality of consecutive PW instances, responsive to a determination that an overlapping spectrum between each RS resource of the subset and the active BWP during a subset of the PW instances of the plurality of consecutive PW instances meets an accuracy requirement.

Clause 23. The method of any of clauses 17-19 wherein performing the one or more measurements of the one or more RS resources during the at least one PW comprises: measuring an initial subset of RS resources of an RS resource set during an initial PW instance of a plurality of consecutive PW instances, responsive to a determination that an overlapping spectrum of the active BWP during the initial PW instance meets an accuracy requirement; and measuring one or more subsequent the same subset of RS resources of the RS resource set during one or more subsequent PW instances of the plurality of consecutive PW instances.

Clause 24. The method of any of clauses 17-23 wherein the information indicative of the one or more measurements of the one or more RS resources includes information indicative of: the frequency spectrum of the active BWP during the one or more measurements, the BW of the active BWP during the one or more measurements, a ratio of a BW of an overlapping spectrum between the one or more RS resources and the active BWP to the first frequency spectrum, a ratio of a BW of an overlapping spectrum between the one or more RS resources and the active BWP to the second frequency spectrum, or whether the one or more measurements met an accuracy requirement, or any combination thereof.

Clause 25. A device for coordinating reference signal (RS) processing by a user equipment (UE), the device comprising: a transceiver; a memory; and one or more processors communicatively coupled with the transceiver and the memory, wherein the one or more processors are configured to: obtain information regarding at least one processing window (PW) during which the UE is configured to perform one or more measurements of one or more RS resources, the one or more RS resources having a first frequency spectrum; and implement a bandwidth part (BWP) restriction of a first BWP of the UE during the at least one PW based at least in part on the information regarding the at least one PW, wherein: the first BWP has a second frequency spectrum, the first frequency spectrum and the second frequency spectrum at least partly overlap to form an overlapping spectrum, and the first BWP and the one or more RS resources have the same numerology.

Clause 26. The device of clause 25, wherein device comprises the UE.

Clause 27. The device of any of clauses 25-26 wherein, to implement the BWP restriction, the one or more processors are configured to suspend a BWP inactivity timer of the first BWP during the at least one PW.

Clause 28. The device of any of clauses 25-27 wherein to obtain the information regarding the at least one PW, the one or more processors are configured to: send a PW configuration request via the transceiver to a serving base station of the UE; and receive a PW configuration via the transceiver from the serving base station, the PW configuration comprising the information regarding the at least one PW.

Clause 29. The device of clause 28 wherein the one or more processors are further configured to include a request for the BWP restriction with the PW configuration request.

Clause 30. The device of any of clauses 28-29 wherein the one or more processors are further configured to obtain information regarding the BWP restriction from the PW configuration.

Clause 31. The device of any of clauses 25-30 wherein, to implement the BWP restriction, the one or more processors are configured to determine the BWP restriction based at least in part on the information regarding the at least one PW.

Clause 32. The device of clause 25 wherein the device comprises a serving base station of the UE.

Clause 33. The device of any of clauses 25 or 32 wherein, to implement the BWP restriction, the one or more processors are configured to prevent reconfiguration or switching of the first BWP, prevent a change in either or both of a numerology or bandwidth (BW) of the first BWP, or prevent a change in the overlapping spectrum, or a combination thereof.

Clause 34. The device of any of clauses 25 or 32-33 wherein, to obtain the information regarding the at least one PW, the one or more processors are configured to receive, via the transceiver, a PW configuration request from the UE or a location server; and responsive to receiving the PW configuration request, determine a PW configuration.

Clause 35. The device of clause 34 wherein the one or more processors are further configured to: send, via the transceiver, the PW configuration to the UE.

Clause 36. The device of clause 35 wherein the one or more processors are further configured to include information regarding the BWP restriction in the PW configuration.

Clause 37. The device of any of clauses 25-36 wherein the at least one PW comprises a plurality of consecutive PW instances, and wherein, to implement the BWP restriction during the at least one PW, the one or more processors are configured to implement the BWP restriction during each PW instance of the plurality of consecutive PW instances.

Clause 38. The device of any of clauses 25-37 wherein, to implement the BWP restriction, the one or more processors are configured to implement the BWP restriction in accordance with a BWP configuration.

Clause 39. The device of clause 38 wherein the one or more processors are further configured to select the BWP configuration from a plurality of predetermined BWP configurations based at least in part on information regarding the one or more RS resources.

Clause 40. A user equipment (UE) for coordinating reference signal (RS) processing, the UE comprising: a transceiver; a memory; and one or more processors communicatively coupled with the transceiver and the memory, wherein the one or more processors are configured to: obtain, via the transceiver, information regarding at least one processing window (PW) during which the UE is configured to perform one or more measurements of one or more RS resources, the one or more RS resources having a first frequency spectrum; perform the one or more measurements of the one or more RS resources with the UE during the at least one PW using an active BWP of the UE, wherein, for at least a portion of the at least one PW, the active BWP uses a second frequency spectrum that at least partly overlaps with the first frequency spectrum; and send information indicative of the one or more measurements of the one or more RS resources via the transceiver to a location server.

Clause 41. The UE of clause 40, wherein the one or more processors are configured to perform the one or more measurements of the one or more RS resources responsive to a determination that a BW of an overlapping spectrum between the one or more RS resources and the active BWP satisfies a threshold value.

Clause 42. The UE of clause 40 wherein the one or more processors are further configured to: perform one or more second measurements of the one or more RS resources using a portion of the first frequency spectrum not included in an overlapping spectrum between the one or more RS resources and the active BWP; and send information indicative of the use of the portion of the first frequency spectrum not included in the overlapping spectrum.

Clause 43. The UE of any of clauses 40-42 wherein, to perform the one or more measurements of the one or more RS resources during the at least one PW, the one or more processors are configured to measure all RS resources of an RS resource set during a plurality of consecutive PW instances, responsive to a determination that an overlapping spectrum between at least one RS resource of the RS resource set and the active BWP during one or more of the PW instances of the plurality of consecutive PW instances, meets an accuracy requirement.

Clause 44. The UE of any of clauses 40-42 wherein, to perform the one or more measurements of the one or more RS resources during the at least one PW, the one or more processors are configured to measure a subset of RS resources of an RS resource set during a plurality of consecutive PW instances, responsive to a determination that an overlapping spectrum between each RS resource of the subset and the active BWP during a subset of the PW instances of the plurality of consecutive PW instances meets an accuracy requirement.

Clause 45. The UE of any of clauses 40-42 wherein, to perform the one or more measurements of the one or more RS resources during the at least one PW, the one or more processors are configured to measure an initial subset of RS resources of an RS resource set during an initial PW instance of a plurality of consecutive PW instances, responsive to a determination that an overlapping spectrum of the active BWP during the initial PW instance meets an accuracy requirement; and measure one or more subsequent the same subset of RS resources of the RS resource set during one or more subsequent PW instances of the plurality of consecutive PW instances.

Clause 46. An apparatus having means for performing the method of any one of clauses 1-24.

Clause 47. A non-transitory computer-readable medium storing instructions, the instructions comprising code for performing the method of any one of clauses 1-24.

What is claimed is:

1. A method of coordinating reference signal (RS) processing by a user equipment (UE), the method comprising:
obtaining information regarding at least one processing window (PW) during which the UE is configured to perform one or more measurements of one or more RS resources, the one or more RS resources having a first frequency spectrum; and
implementing a bandwidth part (BWP) restriction of a first BWP of the UE during the at least one PW based at least in part on the information regarding the at least one PW, wherein:
the first BWP has a second frequency spectrum,
the first frequency spectrum and the second frequency spectrum at least partly overlap to form an overlapping spectrum, and
the first BWP and the one or more RS resources have the same numerology.

2. The method of claim 1, wherein the method is performed by the UE.

3. The method of claim 2, wherein implementing the BWP restriction comprises suspending a BWP inactivity timer of the first BWP during the at least one PW.

4. The method of claim 2, wherein the information regarding the at least one PW is included in a PW configuration, and wherein obtaining the information regarding the at least one PW comprises:
sending a PW configuration request from the UE to a serving base station of the UE; and
receiving the PW configuration at the UE from the serving base station.

5. The method of claim 4, further comprising including a request for the BWP restriction with the PW configuration request.

6. The method of claim 4, wherein the PW configuration comprises information regarding the BWP restriction.

7. The method of claim 2, wherein implementing the BWP restriction comprises determining the BWP restriction based at least in part on the information regarding the at least one PW.

8. The method of claim 1, wherein the method is performed by a serving base station of the UE.

9. The method of claim 8, wherein implementing the BWP restriction comprises:
preventing reconfiguration or switching of the first BWP,
preventing a change in either or both of a numerology or bandwidth (BW) of the first BWP, or
preventing a change in the overlapping spectrum, or
a combination thereof.

10. The method of claim 8, wherein obtaining the information regarding the at least one PW comprises:
receiving, at the serving base station, a PW configuration request from the UE or a location server; and
responsive to receiving the PW configuration request, determining a PW configuration.

11. The method of claim 10, further comprising:
sending the PW configuration from the serving base station to the UE.

12. The method of claim 11, further comprising including information regarding the BWP restriction in the PW configuration.

13. The method of claim 1, wherein the at least one PW comprises a plurality of consecutive PW instances, and wherein implementing the BWP restriction during the at least one PW comprises implementing the BWP restriction during each PW instance of the plurality of consecutive PW instances.

14. The method of claim 13, wherein the UE switches to a second BWP after a first PW instance of the plurality of consecutive PW instances, and wherein implementing the BWP restriction further comprises the UE switching from the second BWP back to the first BWP before or at a beginning of a second PW instance of the plurality of consecutive PW instances.

15. The method of claim 1, wherein implementing the BWP restriction comprises implementing the BWP restriction in accordance with a BWP configuration.

16. The method of claim 15, further comprising selecting the BWP configuration from a plurality of predetermined BWP configurations based at least in part on information regarding the one or more RS resources.

17. A device for coordinating reference signal (RS) processing by a user equipment (UE), the device comprising:
a transceiver;
a memory; and
one or more processors communicatively coupled with the transceiver and the memory, wherein the one or more processors are configured to:
obtain information regarding at least one processing window (PW) during which the UE is configured to perform one or more measurements of one or more RS resources, the one or more RS resources having a first frequency spectrum; and
implement a bandwidth part (BWP) restriction of a first BWP of the UE during the at least one PW based at least in part on the information regarding the at least one PW, wherein:
the first BWP has a second frequency spectrum,
the first frequency spectrum and the second frequency spectrum at least partly overlap to form an overlapping spectrum, and
the first BWP and the one or more RS resources have the same numerology.

18. The device of claim 17, wherein device comprises the UE.

19. The device of claim 18, wherein, to implement the BWP restriction, the one or more processors are configured to suspend a BWP inactivity timer of the first BWP during the at least one PW.

20. The device of claim 18, wherein to obtain the information regarding the at least one PW, the one or more processors are configured to:
send a PW configuration request via the transceiver to a serving base station of the UE; and
receive a PW configuration via the transceiver from the serving base station, the PW configuration comprising the information regarding the at least one PW.

21. The device of claim 20, wherein the one or more processors are further configured to include a request for the BWP restriction with the PW configuration request.

22. The device of claim 20, wherein the one or more processors are further configured to obtain information regarding the BWP restriction from the PW configuration.

23. The device of claim 18, wherein, to implement the BWP restriction, the one or more processors are configured to determine the BWP restriction based at least in part on the information regarding the at least one PW.

24. The device of claim 17, wherein the device comprises a serving base station of the UE.

25. The device of claim 24, wherein, to implement the BWP restriction, the one or more processors are configured to:
- prevent reconfiguration or switching of the first BWP,
- prevent a change in either or both of a numerology or bandwidth (BW) of the first BWP, or
- prevent a change in the overlapping spectrum, or
- a combination thereof.

26. The device of claim 24, wherein, to obtain the information regarding the at least one PW, the one or more processors are configured to:
- receive, via the transceiver, a PW configuration request from the UE or a location server; and
- responsive to receiving the PW configuration request, determine a PW configuration.

27. The device of claim 26, wherein the one or more processors are further configured to:
- send, via the transceiver, the PW configuration to the UE.

28. The device of claim 27, wherein the one or more processors are further configured to include information regarding the BWP restriction in the PW configuration.

29. The device of claim 17, wherein the at least one PW comprises a plurality of consecutive PW instances, and wherein, to implement the BWP restriction during the at least one PW, the one or more processors are configured to implement the BWP restriction during each PW instance of the plurality of consecutive PW instances.

30. The device of claim 17, wherein, to implement the BWP restriction, the one or more processors are configured to implement the BWP restriction in accordance with a BWP configuration.

31. The device of claim 30, wherein the one or more processors are further configured to select the BWP configuration from a plurality of predetermined BWP configurations based at least in part on information regarding the one or more RS resources.

* * * * *